US012635683B2

(12) United States Patent (10) Patent No.: US 12,635,683 B2
Campbell et al. (45) Date of Patent: May 26, 2026

(54) PRESERVATION OF NATURAL AND BIOENGINEERED TISSUES AND METHODS OF STORING AND TRANSPORT

(71) Applicant: LifeNet Health, Virginia Beach, VA (US)

(72) Inventors: Lia H. Campbell, Mount Pleasant, SC (US); Kelvin G.M. Brockbank, Charleston, SC (US)

(73) Assignee: LifeNet Health, Virginia Beach, VA (US)

( * ) Notice: Subject to any disclaimer, the term of this patent is extended or adjusted under 35 U.S.C. 154(b) by 790 days.

(21) Appl. No.: 17/987,404

(22) Filed: Nov. 15, 2022

(65) Prior Publication Data

US 2023/0148587 A1 May 18, 2023

Related U.S. Application Data

(60) Provisional application No. 63/279,237, filed on Nov. 15, 2021.

(51) Int. Cl.
*A01N 1/125* (2025.01)
(52) U.S. Cl.
CPC .................................... *A01N 1/125* (2025.01)
(58) Field of Classification Search
CPC ........ A01N 1/125; A01N 1/122; A01N 1/147; A01N 1/162; A01N 1/142
See application file for complete search history.

(56) References Cited

U.S. PATENT DOCUMENTS

| 2020/0154697 A1 | 5/2020 | Toner et al. |
| 2021/0137099 A1 | 5/2021 | Brockbank et al. |

FOREIGN PATENT DOCUMENTS

WO     WO-2010096821 A2 * 8/2010 ............. A01N 1/125

OTHER PUBLICATIONS

Mar. 13, 2023 International Search Report issued in International Application No. PCT/US2022/049930.
Mar. 13, 2023 Written Opinion of the International Searching Authority issued in International Application No. PCT/US2022/049930.
Fujita, R. et al. "The Effect of Antioxidants and a Caspase Inhibitor on Cryopreserved Rat Hepatocytes", Cell Transplantation, vol. 14, No. 6, Dec. 17, 2005, pp. 391-396.
Oct. 17, 2023 Written Opinion issued in International Patent Application No. PCT/US2022/049930.

* cited by examiner

*Primary Examiner* — Aaron J Kosar
(74) *Attorney, Agent, or Firm* — Matney Legal Group PLLC

(57) ABSTRACT

Described herein are methods for preserving biomaterials by vitrification while reducing or preventing the loss of viability associated with conventional preservation methods. Also described herein are cassettes and methods for using these cassettes for cryopreserving biomaterials (e.g., a bioengineered construct or natural tissue sample).

23 Claims, 9 Drawing Sheets

PRESERVATION OF NATURAL AND BIOENGINEERED TISSUES AND METHODS OF STORING AND TRANSPORT

CROSS-REFERENCE TO RELATED APPLICATION

This application claims priority to U.S. Provisional Application No. 63/279,237 filed Nov. 15, 2021. The disclosure of the prior application is hereby incorporated by reference in its entirety.

GOVERNMENT SUPPORT

The invention was supported, in whole or in part, by grant 1R43TR003258-01, from the National Institutes of Health. The Government has certain rights in the invention.

TECHNICAL FIELD

This disclosure relates to methods for cryopreserving natural and bioengineered tissues, such as bioengineered constructs, while reducing or preventing the loss of viability associated with conventional preservation methods. This disclosure further relates to a specially designed cassette and a high throughput system that can preserve multiple natural and bioengineered tissues, such as bioengineered constructs, at once {e.g., via using the specially designed cassette, which can hold a predetermined number (for example, from 6 to 384, such as 24) of well inserts containing natural and bioengineered tissues, such as bioengineered constructs, at one time}.

BACKGROUND

Over the past few decades, storage methods and techniques have been developed to preserve eukaryotic tissues and cells. These storage methods and techniques are directed to storing various eukaryotic cells in engineered extracellular matrices, engineered tissues, and natural tissues for a period of time in a manner that allows for the use of these stored tissues at a later date, such as for implantation or transplantation into patients or for drug or chemical screening bioassays.

Although these storage methods and techniques are widely applicable both in basic research and translational research settings, maintaining biomaterial properties (e.g., cell viability and extracellular matrix integrity) during storage remains a challenge, particularly for bioengineered constructs. For example, significantly decreased extracellular matrix permeability and tissue cell viability has been observed using current techniques, and these decreases can lead to inefficient biomaterial function after removal from storage.

Development of in vitro assays for a variety of human tissues continues in response to the demand to reduce the number of animals being used in research, to find more cost-effective methods for screening new drugs, compounds or methods, and to find in vitro assays that are more predictive of the in vivo response in humans. There is an increasing amount of research that supports the use of tissue engineered constructs from a variety of tissues not just skin for toxicology testing. In this regard, 3D human tissue models and tissue equivalent constructs are quickly replacing animal models for predictive toxicity screening and models for drug discovery. They cost less and are arguably more akin to natural human responses than equivalent animal models.

For example, companies involved in the production of cosmetics, chemicals, household products and pharmaceuticals have started using tissue equivalent constructs to replace animal testing (see Afaq et al., Protective effect of pomegranate-derived products on UVB-mediated damage in human reconstituted skin, Exp Dermatol., 18(6): 553-61 (2009); Felippi et al., Safety and efficacy of antioxidants-loaded nanoparticles for an anti-aging application, J Biomed Nanotechnol, 8(2): 316-321 (2012); Jírová et al., Comparison of human skin irritation patch test data with in vitro skin irritation assays and animal data, Contact Dermatitis, 62(2): 109-16 (2010); Kaluzhny et al., Development of the EpiOcular™ eye irritation test for hazard identification and labeling of eye irritating chemicals in response to the requirements of the EU cosmetics directive and REACH legislation, Altern Lab Anim, 39(4): 339-64 (2011); Kolle et al., In-house validation of the EpiOcular™ eye irritation test and its combination with the bovine corneal opacity and permeability test for the assessment of ocular irritation, Altern Lab Anim, 39(4): 365-87 (2011); Ren et al., Use of the EpiAirway model for characterizing long-term host-pathogen interactions. J Vis Exp. 55: e3261 (2011); Scheel et al., Classification and labeling of industrial products with extreme pH by making use of in vitro methods for the assessment of skin and eye irritation and corrosion in a weight of evidence approach, Toxicol In Vitro, 25(7): 1435-47 (2011); and Sharma et al., The efficacy of Echinacea in a 3-D tissue model of human airway epithelium, Phytother Res., 24(6): 900-4 (2010)). The disclosures of these publications in their entireties are hereby incorporated by reference into this application, for example, to more fully describe the state of the art to which this disclosure pertains.

In vitro tissue models, such as Epiderm by MatTek, have been validated for use in toxicity testing of cosmetic ingredients pushed by the European Union regulation that has prohibited the use of animals for collecting toxicological data on cosmetic ingredients since 2009. It is anticipated that a ban on toxicity testing using animals for other types of compounds such as pharmaceuticals will soon follow increasing the demand for in vitro models of all tissue types. Tissue constructs are generally made from a single cell type, but with multiple cell layers. In some instances, constructs with multiple cell types have also been developed. So, while it is more complex than a monolayer of cells in a dish or plate, it is not exactly like a native tissue, such as a vein segment or piece of cartilage.

These bioengineered human tissues are currently made in custom batches, by industrial suppliers, which must be used quickly upon receipt. That is, bioengineered constructs are generally made to order, so a lead time of several weeks is required to make them prior to being shipped. Shipments are sent overnight at 4° C. and the bioengineered tissues, such as bioengineered constructs, must be used within a finite time period (1-2 weeks) for best results. Due to the short time that these cellular materials can be used, there are occasions where quality control testing cannot be completed prior to shipment but must be done retrospectively. These delayed quality control testing results may ultimately reveal that the batches do not meet the predetermined quality control standards long after the customer has expended extensive resources, time and effort, using tissue equivalents in their research projects. Availability can also be an issue if a validated construct becomes unavailable for various reasons, such as weather or production problems due to a lack of appropriate starting materials. Then development of drugs and other compounds are put on hold without this tool for toxicity testing and time and money are wasted due to inactivity. Thus, there is a need for improved methodology for preserving bioengineered tissues, such as bioengineered constructs, for later use.

Presently, cryopreservation methods are not used to preserve these tissues for later use. Cryopreservation methodology would drastically increase the availability of bioengineered tissues, such as bioengineered constructs, expanding the market, reducing overall manufacturing costs by economies of scale, resulting in more efficient shipment and delivery to customers.

That is, methods to cryopreserve these bioengineered tissues, such as bioengineered constructs, would eliminate the lead time required to make the bioengineered tissues in response to orders, allow quality control checks for stock prior to shipping and reduce costs due to economies of scale. The end-user would have greater flexibility for scheduling of experiments without concerns for bioengineered tissues availability or quality. The customer can also order large quantities of the same batch of product in order to better control uniformity within studies. Validated cryopreserved tissue constructs could be shipped to any laboratory in the food, drug, cosmetic, or chemical industry for convenient use as an alternative to in vivo testing.

While preservation of bioengineered tissues, such as bioengineered constructs, would appear straight forward, conventional cryopreservation by freezing does not yield viable bioengineered tissues, such as bioengineered constructs, with the best viability (generally at <50%).

The effectiveness of vitrification strategies has been repeatedly demonstrated for preservation of the architecture, extracellular matrix, and viability of natural and bioengineered tissues ranging from blood vessels, heart valves, encapsulated cells and cartilage (see Brockbank et al., Quantitative Analyses of Vitrified Autologous Venous Arterial Bypass Graft Explants, Cell Preservation Technology, 5 (2) (2007); 68-76; Brockbank et al., Vitrification of Porcine Articular Cartilage, Cryobiology 60, 217-221, http://www.pubmedcentral.gov/articlerender.fcgi?artid=2834839 (2010); Dahl et al., Feasibility of vitrification as a storage method for tissue-engineered blood vessels, Tissue Eng., 12(2):291-300 (2006); Schenke-Layland et al., Optimized preservation of extracellular matrix in cardiac tissues: implications for long-term graft durability, Annals of Thoracic Surgery, 83:1641-1650 (2007); Song et al., Vitreous cryopreservation maintains the function of vascular grafts, Nature Biotechnology, 8(3):296-9, Epub 2000/03/04, doi: 10.1038/73737, PubMed PMID: 10700144 (2000); Song et al., Vitrification of tissue engineered pancreatic substitute, Transplantation Proceedings, 37 (1):253-255 (2005); and Song et al., Vitreous Preservation of Rabbit Articular Cartilage, Cell Preservation Technology, 2 (1); 67-74 (2004)). The disclosures of these publications in their entireties are hereby incorporated by reference into this application, for example, to more fully describe the state of the art to which this disclosure pertains. Vitrification is the solidification of a liquid without crystallization. As cooling proceeds molecular motions in the liquid permeating the tissue decrease. Eventually, an "arrested liquid" state known as a glass is achieved. It is this conversion of a liquid into a glass that is called vitrification (derived from vitri, the Greek word for glass). Vitrification can be achieved by adjusting the solute composition and the cooling rate such that nucleation and growth of ice crystals is prevented.

However, the downside of using these high cryoprotectant (CPA) concentrations generally used in vitrification processes may be cytotoxicity. But one of the advantages of vitrification is that it does not have any of the biologically damaging effects associated with freezing because no appreciable degradation occurs over time in living matter trapped within a vitreous matrix.

Thus, although successful cryopreservation of individual constructs has been achieved, there is a need to improve the yield of the viable tissue constructs (i.e., to be substantially higher than 50%). Additionally, while it is possible to preserve multiple constructs at once (conventionally this is possible only when two technicians work together), there is a further need for a high throughput system that can preserve multiple constructs at once where the yield of the viable tissue constructs is substantially higher than 50%.

The inventors of the present disclosure have developed methodology that allows this to be accomplished (i.e., preservation of an individual natural or bioengineered tissue, such as bioengineered construct, or multiple natural and/or bioengineered tissues, such as bioengineered constructs, where the yield of the viable tissue constructs is substantially higher than 50%). In some embodiments, this involves using the cassette of the present disclosure, which can hold and successfully preserve, for example, numerous (such as, for example, 24 or up to 384) well inserts containing natural and/or bioengineered tissues, such as bioengineered constructs, at one time. The cassette has two parts that fit together to hold the inserts. The top has place holders to keep the inserts in place in a configuration that is compatible with the well arrangement of the well plate. This configuration facilitates moving the biomaterials (e.g., natural and/or bioengineered tissues, such as bioengineered constructs), from the cassette to plate as needed. Holes are present in both parts of the cassette to allow a solution (such as a solution used during the vitrification steps) to easily flow through and around each insert and biomaterials (e.g., natural and/or bioengineered tissues, such as bioengineered constructs). In some embodiments, the cassette can be submerged in the vitrification solution for cryoprotectant load/unload steps and during actual vitrification. The place holders can be easily modified to hold pieces of native tissue for preservation as well. The cassette can be easily adapted to automation of the entire vitrification process.

SUMMARY

Described herein are methods for preserving biomaterials (e.g., natural and/or bioengineered tissues, such as bioengineered constructs) while reducing or preventing the loss of viability associated with conventional preservation methods. Also described herein are cassettes and methods for using these cassettes for cryopreserving biomaterials (e.g., natural and/or bioengineered tissues, such as bioengineered constructs).

In this regard, described herein are methods for preserving at least one bioengineered construct or natural tissue sample, comprising: (i) immersing the at least one bioengineered construct or natural tissue sample in a series of solutions having increasing concentrations of cryoprotectant to form at least one first bioengineered construct or natural tissue that is immersed in a final solution with a cryoprotectant concentration of less than or equal to 70% by weight; (ii) cooling the at least one first bioengineered construct or natural tissue in the final solution having said cryoprotectant concentration of less than or equal to 70% by weight to a temperature below the glass transition temperature of the final solution having said cryoprotectant concentration of less than or equal to 70% by weight; and (iii) immersing the at least one first bioengineered construct or natural tissue in a series of solutions having decreasing concentrations of cryoprotectant to obtain at least one second bioengineered construct or natural tissue immersed in a substantially cryoprotectant-free solution, the at least one second bioengineered construct or natural tissue being a substantially cryoprotectant-free construct.

DETAILED DESCRIPTION OF THE EMBODIMENTS

Figure 1:
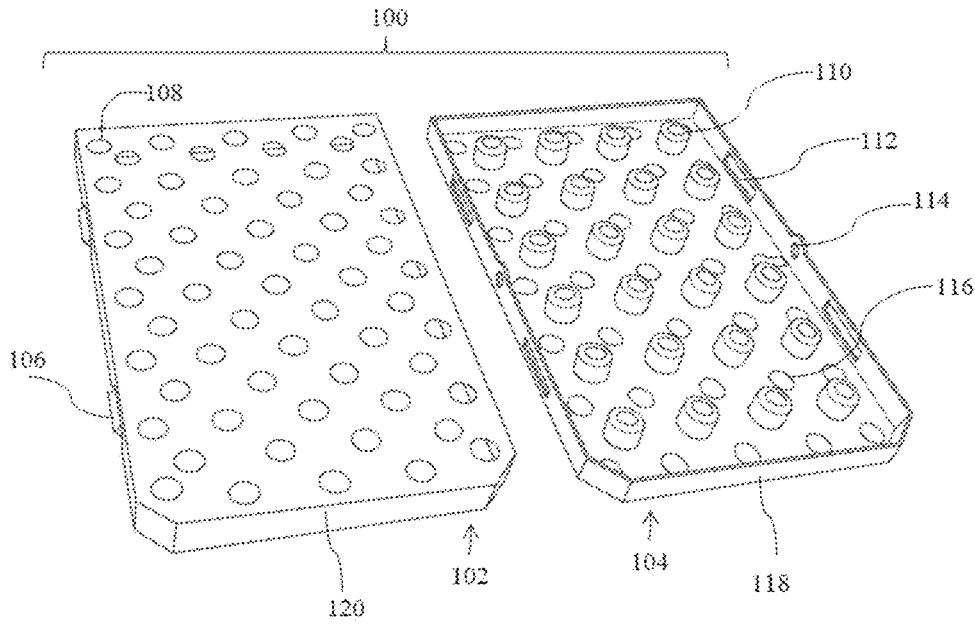
FIG. 1 illustrates a schematic view of a cassette according to an embodiment.

The disclosed cassettes and methods may be understood more readily by reference to the following detailed description of particular embodiments, the Examples included herein, and to the Figures and their descriptions.

In this specification and in the claims that follow, reference will be made to a number of terms that shall be defined to have the following meanings:

As used herein, the term "room temperature" refers to a temperature of about 18° C. to about 25° C. at standard pressure. In various examples, room temperature may be about 18° C., about 19° C., about 20° C., about 21° C., about 22° C., about 23° C., about 24° C., or about 25° C.

As used herein, the term "vitrification" refers to solidification either without ice crystal formation or without substantial ice crystal formation. In some embodiments, a sample to be preserved (e.g., such as a tissue or cellular material) may be vitrified such that vitrification and/or vitreous cryopreservation (in its entirety—from initial cooling to the completion of rewarming) may be achieved without any ice crystal formation. In some embodiments, a sample to be preserved (e.g., such as a tissue or cellular material) may be vitrified such that vitrification and/or vitreous cryopreservation may be achieved where the solidification of the sample to be preserved (e.g., such as a tissue or cellular material) may occur without substantial ice crystal formation (i.e., the vitrification and/or vitreous cryopreservation (in its entirety—from initial cooling to the completion of rewarming) may be achieved even in the presence of a small, or restricted amount of ice, which is less than an amount that causes injury to the tissue).

As used herein, a sample or biomaterial to be preserved (e.g., a natural or bioengineered tissue, such as a bioengineered construct) is vitrified when it reaches the glass transition temperature (Tg). The process of vitrification involves a marked increase in viscosity of the cryoprotectant solution as the temperature is lowered such that ice nucleation and growth are inhibited. Generally, the lowest temperature a solution can possibly supercool to without freezing is the homogeneous nucleation temperature $T_h$, at which temperature ice crystals nucleate and grow, and a crystalline solid is formed from the solution. Vitrification solutions have a glass transition temperature $T_g$, at which temperature the solute vitrifies, or becomes a non-crystalline solid.

As used herein, the "glass transition temperature" refers to the glass transition temperature of a solution or formulation under the conditions at which the process is being conducted. In general, the methodology of the present disclosure is conducted at physiological pressures. However, higher pressures can be used as long as the sample to be preserved (e.g., such as a tissue or cellular material) is not significantly damaged thereby.

As used herein, the term "cryoprotectant" means a chemical that minimizes ice crystal formation in and around a tissue/organ when the tissue is cooled to subzero temperatures and results in substantially no damage to the tissue/organ after warming, in comparison to the effect of cooling without cryoprotectant.

As used herein, the term "biomaterial" includes natural and/or bioengineered cells or tissues, or non-plant, mammalian eukaryotic bioengineered constructs (bioengineered constructs). As used herein, the terms "tissue", "tissues", "construct" or "constructs" comprise and/or be derived from any kind of cell type and combinations thereof, including, for example, ovarian tissue, testicular tissue, umbilical cord tissue, placental tissue, connective tissue, cardiac tissue, tissues from muscle, cartilage and bone, endocrine tissue, skin, neural tissue, somatic cells (including all kind of cells in tissue or organs), fibroblasts, keratinocytes, hepatocytes, chondrocytes, smooth muscle cells, stem cells, progenitor cells, oocytes, and germ cells.

The terms "tissue", "tissues", "construct" or "constructs" may also comprise adipose tissue or dental pulp tissue. In some embodiments, the "tissue" or "tissues may be obtained from a human such as a human liver, human lung, human kidney, human intestine, human heart, human pancreas, human testes, human placenta, human thymus, human adrenal gland, human arteries, human veins, human nerves, human skin, human lymph nodes, human bone or human skeletal muscle. In some embodiments, the "construct" or "constructs" may be obtained and/or derived from a human tissue or organ such as a human liver, human lung, human kidney, human intestine, human heart, human pancreas, human testes, human placenta, human thymus, human adrenal gland, human arteries, human veins, human nerves, human skin, human lymph nodes, human bone or human skeletal muscle.

As used herein, the term "functional after cryopreservation" in relation to a cryopreserved biomaterial means that the cryopreserved biomaterial, like natural and/or bioengineered cells and tissues, such as bioengineered constructs, after cryopreservation retains an acceptable and/or intended function (e.g., such that it may serve as a model for predictive toxicity screening and models for drug discovery). In some embodiments, the cellular material of the biomaterial after cryopreservation retains all its intended function. In some embodiments, the cellular cryopreserved biomaterial preserved by the methods of the present disclosure retains at least 50% of the intended function, such as at least 60% of the intended function, such as at least 70% of the intended function, such as at least 80% of the intended function, such as at least 90% of the intended function, such as at least 95% of the intended function, such as 100% of the intended function. For example, along with preserving the viability of the cells, it may be important to also maintain/preserve the physiological function of the biomaterial(s) (e.g., natural and/or bioengineered tissues, such as bioengineered constructs) such that it may serve as a model for predictive toxicity screening and models for drug discovery, and/or the ability of a tissue (e.g., those to be transplanted) to integrate with surrounding tissue.

Described herein are viable biomaterial(s) (e.g., natural and/or bioengineered tissues, such as bioengineered constructs), and methods for preserving/storing such constructs, such as in the cassette of the present disclosure.

In certain aspects, these biomaterials include eukaryotic cells (which may be either engineered or natural tissues or a combination of both), and the methods described herein include preserving/storing these biomaterials (e.g., natural and/or bioengineered tissues, such as bioengineered constructs) in such a manner that either reduces or prevents the loss of biomaterial properties (e.g., tissue/cell viability, extracellular matrix integrity, or a combination thereof) occurring either during storage or after removal of the biomaterial(s) (e.g., natural and/or bioengineered tissues, such as bioengineered constructs) from storage. In embodiments, these biomaterials (e.g., natural and/or bioengineered tissues, such as bioengineered constructs) are placed into a solution or a series of solutions (e.g., to achieve a final cryoprotectant concentration), such as precooled vitrification formulation(s), containing at least one agent, such as a cryoprotectant. Subsequently, the biomaterials (e.g., natural and/or bioengineered tissues, such as bioengineered constructs) placed into the solution containing at least one agent are then stored at a particular temperature range until these biomaterials (e.g., natural and/or bioengineered tissues, such as bioengineered constructs) are further needed. The concentration of the at least one agent, such as cryoprotectant, is optimized such that biomaterial properties (e.g., cell viability and/or extracellular matrix integrity) of the biomaterials (e.g., natural and/or bioengineered tissues, such as bioengineered constructs) are maximized.

When using the biomaterial(s) (e.g., natural and/or bioengineered tissues, such as bioengineered constructs) described herein with the compositions and methods described herein, one objective is to prevent the loss of cell viability and/or prevent loss of extracellular matrix integrity.

For example, in certain aspects an objective of the present disclosure is to reduce or prevent the loss of the biomaterial's cell viability. In certain aspects, various types of cell death, including but not limited to, necrotic cell death, apoptotic cell death, autophagic (Type II) cell death, anoikis, and necroptosis can be reduced or prevented using the compositions, cassettes and methods described herein, and in certain aspects, these types of cell death can be limited by the use of an agent as described further below. Metabolic activity assays (e.g., a resazurin assay, which is used to assess cell viability by measuring the oxidation/reduction reactions that take place within cells), various cellular staining techniques (e.g., a Trypan Blue exclusion assay and live/dead stains), immunohistochemistry, biochemistry and various gene expression assays can be used for assessing the viability.

In addition, extracellular matrix integrity can be determined based on permeability, water content, glycosaminoglycan content, or a combination thereof. In certain aspects, one objective is to maintain at least one of permeability, water content, glycosaminoglycan content, or any combination thereof while storing the biomaterial(s) to prevent or reduce loss of extracellular matrix integrity. When determining matrix integrity of the biomaterial(s), numerous techniques known in the art can be used. These techniques include matrix electrical conductivity assays that measure permeability, water content, and glycosaminoglycan content, indentation tests, stress/strain tests, elasticity, RAMAN spectroscopy, various microscopic methods (such as laser scanning microscopy with second harmonic generation), etc.

In one aspect and when tissue matrices are being used as a biomaterial, preventing or reducing the loss of cell viability and loss of extracellular matrix integrity is important to maintain structural integrity and normal biological function of the biomaterial.

For example, cartilage (e.g., either natural or bioengineered cartilage, such as bioengineered cartilage constructs, contain chondrocytes (i.e., cells) and an extracellular matrix, where the extracellular matrix is primarily composed of collagen fibers, proteoglycans, and elastin fibers. Both chondrocyte viability and cartilage extracellular matrix integrity are important to maintain normal, physiological biological function in in vivo, ex vivo, and in vitro applications. For example, the extracellular matrix of cartilage provides structural integrity and maintains a certain level of rigidity in vivo, which functions in bone support, proper joint mobility, etc. In certain aspects, the permeability of the cartilage's extracellular matrix is of particular importance. For example, cartilage permeability can be associated with and may play an important role in maintaining the structural integrity of the cartilage's extracellular matrix and aiding to maintain chondrocyte viability as well. In certain aspects, decreased permeability of the cartilage's extracellular matrix can be associated with increased chondrocyte viability and decreased cartilage extracellular matrix structural integrity.

The biomaterial(s) described herein (e.g., natural and/or bioengineered tissues, such as bioengineered constructs) can be placed into a solution (such as, for example, a vitrification formulation) that is designed to prevent or reduce the loss of biomaterial properties (e.g., cell viability, extracellular matrix integrity, or a combination thereof), and in certain aspects, this solution can be either an animal product-free solution (e.g., excludes FBS) or can contain animal products (e.g., includes FBS). It should be noted that the below descriptions and embodiments also apply to solutions containing animal products including the biomaterial. In certain aspects, the biomaterial(s) (e.g., natural and/or bioengineered tissues, such as bioengineered constructs) is at least partially submerged in the solution (for example, while the biomaterial(s) is/are comprised in the cassette of the present disclosure), and in other aspects, the biomaterial is completely submerged in the solution (for example, while the biomaterial (s) is/are comprised in the cassette of the present disclosure).

In one aspect, the solution can be an extracellular-type solution including at least one agent that prevents or reduces the loss of biomaterial properties (e.g., cell viability, extracellular matrix integrity, or a combination thereof). For example, extracellular-type solutions can include isotonic, plasma-like solutions with ion complements that mimic the normal extracellular environment of the cells and tissues of the biomaterial(s) (e.g., natural and/or bioengineered tissues, such as bioengineered constructs). These isotonic, plasma-like solutions can include cell culture medium, which provide various amino acids and metabolites to the biomaterial (e.g., cells and/or tissues) for nutritional support. For example, cell culture medium used for the extracellular-type solution can include, but are not limited to, Dulbecco's Modified Eagle Medium (DMEM), αMEM, Glasgow's MEM, Ham's F10, Ham's F-12, Leibovitz's L-15, Iscove's Modified DMEM, DMEM/Ham's F-12, and derivatives thereof. The extracellular-type solution can be animal product-free, such that, before placing the biomaterials (e.g., natural and/or bioengineered tissues, such as bioengineered constructs) into the cell solution, the cell solution contains no animal products. For example, when using cell culture medium, the cell culture medium would not contain fetal bovine serum (FBS) or any other product derived from an animal.

In certain aspects, the solution (such as, for example, a vitrification formulation) includes an intracellular-type solution. The intracellular-type solution can include, but is not limited to, an isotonic solution formulated to restrict the passive exchange of water and ions between cells in the biomaterials (e.g., natural and/or bioengineered tissues, such as bioengineered constructs) and intracellular-type solution during storage. For example, an intracellular-type solution can include a non-permeating anion such as lactobionate or gluconate to partially replace chloride ions in the extracellular space, which provides osmotic support to balance the intracellular oncotic pressure generated by cytosolic macromolecules and their associated counter-ions locked inside the cell. Intracellular-type solutions can include, but are not limited to, VIASPAN® (i.e., Belzer's Solution) and UNISOL® (e.g., SPS-1). Similar to the extracellular-type solution described above, the intracellular-type solution can be animal product-free.

Additional agents/components can be added to the solution (such as, for example, a vitrification formulation) to further supplement the solution and to further promote biomaterial viability. For example, these additional agents/components may provide additional nutritional support for the biomaterial(s) (e.g., natural and/or bioengineered tissues, such as bioengineered constructs), which reduces or prevents the loss of viability of the biomaterial(s) (e.g., natural and/or bioengineered tissues, such as bioengineered constructs). These additional agents/components can include, but are not limited to, a nutrient cocktail having non-animal derived (i.e., synthetically derived) essential amino acids, synthetically derived non-essential amino acids, synthetically derived vitamins, synthetically derived lipids, synthetically derived carbohydrates, or any combination thereof. Examples of the carbohydrates included in the nutrient cocktail can further include saccharides and/or derivatives thereof (e.g., glucose, glycerol, sucrose, trehalose, fructose, galactose, maltose, lactose, etc.), or a combination thereof. Examples of amino acids provided in the cocktail can include, but are not limited to, any combination of glycine, L-arginine, L-cystine, L-glutamine, L-histidine, L-isoleucine, L-leucine, L-lysine, L-methionine, L-phenylalanine, L-serine, L-threonine, L-tryptophan, L-tyrosine, L-valine, or any salt thereof. Examples of vitamins provided in the cocktail can include, but are not limited to, any combination of choline, D-calcium, folic acid, niacinamide, pyridoxine, riboflavin, thiamine, inositol, or any salt thereof. In some aspects, the agent may include one or more of Q-VD-OPH (quinoline-Val-Asp-difluorophenoxymethyl ketone), α-tocopherol, ferulic acid, curcumin, allene oxide synthase, and SDF-1

In certain aspects, the agent can reduce the loss of the biomaterial's properties (e.g., cell viability and/or extracellular matrix integrity) by, for example, 5% or more, 10% or more, 20% or more, 30% or more, 40% or more, 50% or more, 60% or more, 70% or more, 80% or more, 90% or more, or 99% or more when compared to, for example, a control. Stated another way, the agent can substantially or completely inhibit the loss of a biomaterial's (e.g., natural and/or bioengineered tissues, such as bioengineered constructs) properties by, for example, at least 80%, at least 85%, at least 90%, at least 95%, at least 99%, or 100% when compared to, for example, a control.

In certain aspects, the solution includes one or more of such agents at concentrations (in combination or each agent individually) ranging from 1 pM to 2 mM, 10 pM to 1 mM, 1 nM to 1 mM, 100 nM to 0.5 mM, 100 nM to 0.25 mM, 1 μM to 1 mM, 250 μM to 1 mM, 1 pM to 1000 μM, 1 pM to 500 μM, 1 pM to 30 μM, 1 pM to 1000 nM, 1 pM to 500 nM, 1 pM to 250 nM, 100 pM to 750 μM, 100 pM to 500 μM, 100 pM to 20 μM, 100 pM to 1000 nM, 1 pM to 750 nM, 1 pM to 500 nM, 1 pM to 250 nM, 1 pM to 1 nM, 500 pM to 500 μM, 500 pM to 250 μM, 500 pM to 100 μM, 500 pM to 10 μM, 500 pM to 1000 nM, 500 pM, to 750 nM, 500 pM to 500 nM, 500 pM to 250 nM, 500 pM to 100 nM, 500 pM to 1 nM, 1 nM to 1000 μM, 1 nM to 750 μM 1 nM to 500 μM, 1 nM to 250 μM, 1 nM to 100 μM, 1 pM to 1 μM, 100 nM to 1000 μM, 100 nM to 750 μM, 100 nM to 500 μM, 100 nM to 250 μM, 100 nM to 100 μM, 100 pM to 1 μM, 250 nM to 1000 μM, 250 nM to 750 μM, 250 nM to 500 μM, 250 nM to 250 μM, 250 nM to 100 μM, 250 nM to 1 μM, 500 nM to 1000 μM, 500 nM to 750 μM, 500 nM to 500 μM, 500 nM to 250 μM, 500 nM to 100 μM, 500 nM to 1 μM, 750 nM to 1000 μM, 750 nM to 750 μM, 750 nM to 500 μM, 750 nM to 250 μM, 750 nM to 100 μM, 750 nM to 1 μM, 0.5 μM to 1000 μM, from 10 μM to 950 μM, from 20 μM to 900 μM, from 30 μM to 850 μM, from 40 μM, to 800 μM, from 50 μM to 750 μM, from 60 μM to 700 μM, from 70 μM to 650 μM, from 80 μM to 600 pM, from 90 μM to 550 pM, from 100 μM to 500 μM, from 110 μM to 450 μM, from 120 μM, to 400 μM, from 130 μM to 350 μM, from 140 μM to 300 μM, from 150 μM to 250 μM, from 160 μM to 200 μM, from 0.5 μM to 100 μM, from 1 μM to 90 μM, from 5 μM to 90 μM, from 10 μM to 85 μM, from 10 μM to 75 μM, from 20 μM to 85 μM, from 20 μM to 65 μM, from 30 μM to 70 μM, from 30 to 50 μM, from 40 μM to 80 μM, or from 40 μM to 50 μM, wherein any concentration occurring within the above ranges can also serve as an endpoint for a range.

Vitrification may be achieved using a variety of cryoprotectant mixtures and cooling/warming conditions. The key variables should be optimized for each particular extracellular tissue matrix type of the biomaterials (e.g., natural and/or bioengineered tissues, such as bioengineered constructs) and individual biomaterial size. The choice of cryoprotectant mixtures and the equilibration steps necessary for cryoprotectant addition and removal without undue osmotic shock should be optimized based upon measured kinetics of cryoprotectant permeation in biomaterial samples or by demonstration of viability and/or function. Cryosubstitution can also be employed to verify that ice-free preservation has been achieved for a given protocol.

Embodiments may comprise a stepwise cooling process, such as, when the biomaterial(s) (e.g., natural and/or bioengineered tissues, such as bioengineered constructs) is/are cooled to a first temperature in a first solution containing cryoprotectant at a first temperature between the temperature (0 to +4° C.) of the first solution and −20° C., then is further decreased to a second temperature in a second solution containing cryoprotectant (at a higher concentration than the previous solution) at temperature between the temperature of the first solution and −20° C., and this process may be repeated with a third, fourth, fifth, sixth, seventh, etc., solution until the desired cryoprotectant concentration and temperature is achieved. In this regard, as discussed in more detail below, holes are present in both parts of the cassette of the present disclosure to allow each respective solution to easily flow through and around each insert and biomaterial (and replace/displace the previous solution). In some embodiments, the flow of the respective solution may be stopped for a predetermined amount of time such that the cassette can be submerged in respective solution for CPA load/unload steps and/or during actual vitrification or storage.

The final cryoprotectant concentration of the vitrification formulation may be reached in a stepwise cooling process in which the biomaterial(s) (e.g., natural and/or bioengineered tissues, such as bioengineered constructs) may be immersed in a first solution containing a first cryoprotectant concentration (for example, while the biomaterial(s) is/are comprised in the cassette of the present disclosure), then the biomaterial(s) may be immersed (for example, while the biomaterial(s) is/are comprised in the cassette of the present disclosure) in a second solution containing a second cryoprotectant concentration (which is higher than the first cryoprotectant concentration), and this process may be repeated with a third, fourth, fifth, sixth, seventh, etc., solution until the desired concentration is achieved.

The solution/vitrification formulation may contain any combination of cryoprotectants. Suitable cryoprotectants include, for example dimethyl sulfoxide, 1,2-propanediol, ethylene glycol, n-dimethyl formamide and 1,3-propanediol in addition to those listed below: Acetamide, Agarose, Alginate, Alanine, Albumin, Ammonium acetate, Butanediol, Chondroitin sulfate, Chloroform, Choline, Cyclohexanediols, Dextrans, Diethylene glycol, Dimethyl acetamide, Dimethyl formamide, Dimethyl sulfoxide, Erythritol, Ethanol, Ethylene glycol, Ethylene glycol monomethyl ether, Formamide, Glucose, Glycerol, Glycerophosphate, Glyceryl monoacetate, Glycine, Hydroxyethyl starch, Inositol, Lactose, Magnesium chloride, Magnesium sulfate, Mannitol, Mannose, Methanol, Methoxy propanediol, Methyl acetamide, Methyl formamide, Methyl ureas, Methyl glucose, Methyl glycerol, Phenol, Pluronic polyols, Polyethylene glycol, Polyvinylpyrrolidone, Proline, Propylene glycol, Propanediol, Pyridine N-oxide, Ribose, Serine, Sodium bromide, Sodium chloride, Sodium iodide, Sodium nitrate, Sodium nitrite, Sodium sulfate, Sorbitol, Sucrose, Trehalose, Triethylene glycol, Trimethylamine acetate, Urea, Valine, and Xylose.

Other cryoprotectants that may be used are described in U.S. Pat. No. 6,395,467 to Fahy et al.; U.S. Pat. No. 6,274,303 to Wowk et al.; U.S. Pat. No. 6,194,137 to Khirabadi et al.; U.S. Pat. No. 6,187,529 to Fahy et al.; U.S. Pat. No. 5,962,214 to Fahy et al.; U.S. Pat. No. 5,955,448 to Calaco et al.; U.S. Pat. No. 5,629,145 to Meryman; and/or WO 02/32225 A2, which corresponds to U.S. Pat. No. 6,740,484 to Khirabadi et al. the enclosures of which are incorporated by reference in their entireties.

In some embodiments, prior to forming the at least one first bioengineered construct or natural tissue of the present disclosure, the methods of the present disclosure may further comprise immersing at least one bioengineered construct or natural tissue in a pre-vitrification solution (comprising, for example, one or more of the aforementioned agents and/or cryoprotectants) for a predetermined duration, such as, for example, a predetermined duration of at least 4 hours, or at least 6 hours, or at least 12 hours, or a predetermined duration that is in the range of from 3 hours to 15 hours, or a predetermined duration in the range of from 6 hours to 12 hours, or a predetermined duration in the range of from 8 hours to 10 hours, a predetermined duration of about 9 hours. In some embodiments, pre-vitrification solution may comprise or an agent is selected from the group consisting of an anti-oxidant and a caspase inhibitor. Such an agent and/or the aforementioned agents and/or cryoprotectants may be comprised in the pre-vitrification solution at concentrations (in combination or each agent individually) ranging from 1 pM to 2000 mM, 10 pM to 1000 mM, 1 nM to 100 mM, 100 nM to 0.5 mM, 100 nM to 0.25 mM, 1 μM to 1 mM, 250 μM to 1 mM, 1 pM to 1000 μM, 1 pM to 500 μM, 1 pM to 30 μM, 1 pM to 1000 nM, 1 pM to 500 nM, 1 pM to 250 nM, 100 pM to 750 μM, 100 pM to 500 μM, 100 pM to 20 μM, 100 pM to 1000 nM, 1 pM to 750 nM, 1 pM to 500 nM, 1 pM to 250 nM, 1 pM to 1 nM, 500 pM to 500 μM, 500 pM to 250 μM, 500 pM to 100 μM, 500 pM to 10 μM, 500 pM to 1000 nM, 500 pM, to 750 nM, 500 pM to 500 nM, 500 pM to 250 nM, 500 pM to 100 nM, 500 pM to 1 nM, 1 nM to 1000 μM, 1 nM to 750 μM 1 nM to 500 μM, 1 nM to 250 μM, 1 nM to 100 μM, 1 pM to 1 μM, 100 nM to 1000 μM, 100 nM to 750 μM, 100 nM to 500 μM, 100 nM to 250 μM, 100 nM to 100 μM, 100 pM to 1 μM, 250 nM to 1000 μM, 250 nM to 750 μM, 250 nM to 500 μM, 250 nM to 250 μM, 250 nM to 100 μM, 250 nM to 1 μM, 500 nM to 1000 μM, 500 nM to 750 μM, 500 nM to 500 μM, 500 nM to 250 μM, 100 nM to 100 μM, 500 nM to 1 μM, 750 nM to 1000 μM, 750 nM to 750 μM, 750 nM to 500 μM, 750 nM to 250 μM, 750 nM to 100 μM, 750 nM to 1 μM, 0.5 μM to 1000 μM, from 10 μM to 950 μM, from 20 μM to 900 μM, from 30 μM to 850 μM, from 40 μM, to 800 μM, from 50 μM to 750 μM, from 60 μM to 700 μM, from 70 μM to 650 μM, from 80 μM to 600 μM, from 90 μM to 550 μM, from 100 μM to 500 μM, from 110 μM to 450 μM, from 120 μM, to 400 μM, from 130 μM to 350 μM, from 140 μM to 300 μM, from 150 μM to 250 μM, from 160 μM to 200 μM, from 0.5 μM to 100 μM, from 1 μM to 90 μM, from 5 μM to 90 μM, from 10 μM to 85 μM, from 10 μM to 75 μM, from 20 μM to 85 μM, from 20 μM to 65 μM, from 30 μM to 70 μM, from 30 to 50 μM, from 40 μM to 80 μM, or from 40 μM to 50 μM, wherein any concentration occurring within the above ranges can also serve as an endpoint for a range.

The volume of the solutions employed in the methodology of the present disclosure may vary considerably, based upon the size of the biomaterials (e.g., natural and/or bioengineered tissues, such as bioengineered constructs).

In embodiments, the solution includes cryoprotectants in an aqueous solution, such as Euro-Collins solution, sterile water, salt solutions, culture media, and any physiological solution.

The final concentration of the cryoprotectant in the solution used for biomaterial(s) (e.g., natural and/or bioengineered tissues, such as bioengineered constructs) preservation may be any desired predetermined value, but will generally be less than or equal to about 70% cryoprotectant by weight (of the total weight of the preservation solution), such as less than or equal to about 65% cryoprotectant by weight, or less than or equal to about 60% cryoprotectant by weight. In some embodiments, the final concentration of the cryoprotectant in the solution used for the preservation may be in a range of from about 50 to about 80% cryoprotectant by weight (of the total weight of the preservation solution), or about 60 to about 75% cryoprotectant by weight, or about 68 to about 72% by weight. However, in some embodiments (such as bioengineered cartilage), the final concentration of the cryoprotectant in the solution used for the preservation may be higher than the above-mentioned concentrations.

In embodiments, the biomaterial(s) (e.g., natural and/or bioengineered tissues, such as bioengineered constructs) to be preserved may or may not have been previously exposed to a cryoprotectant.

In embodiments, the biomaterial(s) (e.g., natural and/or bioengineered tissues, such as bioengineered constructs) to be preserved may be immersed in (or exposed to) a solution in which the cryoprotectant concentration of the solution may be gradually increased, such as by use of a linear or nonlinear concentration gradient (for example, with respect to the solution that is flowing through the holes of the cassette of the present disclosure in order to contact the biomaterial(s)), to achieve a predetermined final solution cryoprotectant concentration, such as a cryoprotectant concentration of less than or equal to ($\leq$) 70% by weight cryoprotectant. In such embodiments, the concentration gradient is a linear or nonlinear concentration gradient in which a cryoprotectant-free solution (for example, a cryoprotectant-free solution that is initially present in the cassette of the present disclosure and contacting the biomaterial(s) comprised in the cassette) is gradually replaced with the desired solution, such as a solution having a cryoprotectant concentration of $\leq$70% by weight.

For example, the cryoprotectant-free solution (e.g., initially present in the cassette of the present disclosure) may be substantially replaced by a predetermined solution, such as a solution having a cryoprotectant concentration of $\leq$70% by weight, in a time period of about 30 minutes, such as a time period of about 10 minutes, or a time period of about 5 minutes. In embodiments, the rate at which the cryoprotectant-free solution is replaced with the predetermined solution, such as a solution having a cryoprotectant concentration of $\leq$70%, should be low enough not to kill a majority of the living cells present or all living cells present, such rates will depend on the specific tissue/cells of the biomaterial(s) (e.g., natural and/or bioengineered tissues, such as bioengineered constructs) and the size of each individual biomaterial(s). In certain embodiments, the change in concentration during the vitrification is slow enough to achieve approximate osmotic equilibration. In other embodiments, the change in concentration during vitrification is more rapid such that approximate osmotic equilibration is not achieved until the final concentration is reached.

In embodiments, the concentration of the solution is increased in a stepwise manner to achieve the predetermined cryoprotectant concentration solution, such as a solution having a cryoprotectant concentration of less than or equal to 70% by weight. For example, in embodiments, the concentration of the cryoprotectant may be added stepwise to achieve a particular plateau (for example, as measured within the cassette of the present disclosure), which may be maintained for a predetermined amount of time, such as a predetermined amount of time in the range of from 3 to 10 minutes, or a predetermined amount of time in the range of from 4 to 6 minutes, or a predetermined amount of time of about 5 minutes. In certain embodiments, the concentration of the cryoprotectant may be added stepwise to achieve a particular plateau, which may be maintained for a sufficient time to achieve approximate osmotic equilibration, such as for 5 minutes or more, or for about 10 minutes or more, or for about 15 minutes or more. Then, either further cryoprotectant may be added to the first cryoprotectant solution to increase the cryoprotectant concentration or a second more concentrated solution of cryoprotectant may be substituted for the first cryoprotectant solution. Then, after maintaining the concentration for a predetermined amount of time (e.g., corresponding to those mentioned above) or a sufficient time to achieve approximate osmotic equilibration, further cryoprotectant may be added, or a more concentrated may be substituted, in one or more steps to achieve the desired concentration, such as a cryoprotectant concentration of $\leq$70% by weight cryoprotectant.

In embodiments, there may be any number of cryoprotectant concentration plateaus and/or steps, such as any integer between 2 and 10, before reaching the desired concentration, such as a cryoprotectant concentration of $\leq$70% by weight cryoprotectant. For example, in embodiments, four cryoprotectant concentration plateaus may be used before reaching the desired concentration, such as a cryoprotectant concentration of $\leq$70% by weight cryoprotectant.

In some embodiments, there may be six steps, the first step using a cryoprotectant-free solution, which is followed by four increasing cryoprotectant concentration plateaus and then a final predetermined cryoprotectant concentration, such as a cryoprotectant concentration of $\leq$70% by weight cryoprotectant. For example, in such an embodiment in which the final predetermined cryoprotectant concentration is about 70% by weight cryoprotectant, in step 1, no cryoprotectant may be used; in step 2, about 5 to about 20%, such as about 10 to about 15%, of the final cryoprotectant concentration may be used; in step 3, about 15 to about 35%, such as about 20 to about 30%, of the final cryoprotectant concentration may be used; in step 4, about 40 to about 60%, such as about 45 to about 55%, of the final cryoprotectant concentration may be used; in step 5, about 65 to about 85%, such as about 70 to about 80%, of the final cryoprotectant concentration may be used; and in step 6, the final cryoprotectant concentration, which is about 70% by weight cryoprotectant, may be used. In some embodiments, each cryoprotectant concentration step may be of a predetermined duration, such as a predetermined duration that is in the range of from 3 to 10 minutes, or a predetermined duration in the range of from 4 to 6 minutes, or a predetermined duration of about 5 minutes. In some embodiments, each cryoprotectant concentration step may be maintained for a sufficient time to achieve approximate osmotic equilibration.

For example, in some embodiments, the at least one bioengineered construct or natural tissue sample is immersed in 1 to 6 different solutions, or the series of solutions having decreasing concentrations of cryoprotectant is obtained via a linear or nonlinear concentration gradient. In some embodiments, the at least one bioengineered construct or natural tissue sample is immersed in 1 to 6 different solutions, and the at least one bioengineered construct or natural tissue sample is immersed in each of the different solutions for no longer than 5 minutes.

In some embodiments, the methods of the present disclosure comprise: (i) immersing the at least one bioengineered construct or natural tissue sample in a series of solutions having increasing concentrations of cryoprotectant to form at least one first bioengineered construct or natural tissue that is immersed in a final solution with a cryoprotectant concentration of less than or equal to 70% by weight; (ii)

cooling the at least one first bioengineered construct or natural tissue in the final solution having said cryoprotectant concentration of less than or equal to 70% by weight to a temperature below the glass transition temperature of the final solution having said cryoprotectant concentration of less than or equal to 70% by weight; and (iii) immersing the at least one first bioengineered construct or natural tissue in a series of solutions having decreasing concentrations of cryoprotectant to obtain at least one second bioengineered construct or natural tissue immersed in a substantially cryo-protectant-free solution, the at least one second bioengi-neered construct or natural tissue being a substantially cryoprotectant-free construct; where in the step (iii): the at least one first bioengineered construct or natural tissue sample is immersed in 1 to 7 different solutions (and, the at least one first bioengineered construct or natural tissue sample is immersed in each of the different solutions for no longer than 5 minutes), or the series of solutions having increasing concentrations of cryoprotectant is obtained via a linear or nonlinear concentration gradient.

After the biomaterials (e.g., natural and/or bioengineered tissues, such as bioengineered constructs) have been immersed in a solution containing a concentration of cryo-protectant sufficient to reach the desired concentration, such as a cryoprotectant concentration of ≤70% by weight cryo-protectant, the biomaterial(s), which is/are maintained in a solution containing a predetermined concentration of cryo-protectant, such as a cryoprotectant concentration of ≤70% by weight cryoprotectant, may be rapidly cooled (preferably at a rate in the range of from about 35° C./min to 55° C./min, or at a rate of about 45° C./min) to a temperature between −20° C. and the glass transition temperature (for example, while the biomaterial(s) is/are comprised in the cassette of the present disclosure), such as to a temperature of about −100° C. In some embodiments, the rapid cooling rate may be from about −15 to about −75° C. per minute. For example, the average cooling rate may be from about −15 to about −75° C. per minute, such as from about −30 to −60° C. per minute, or from about −35 to −50° C. per minute, or from about −43 to −47° C. per minute. The temperature to which the biomaterial(s) is/are cooled during this rapid cooling process is between about −20° C. and the glass transition temperature of the predetermined final cryopro-tectant solution, such as a cryoprotectant concentration of ≤70%, by weight cryoprotectant, such as between about −80° C. and about −180° C., or between about −90° C. and about −120° C., or about −100° C.

The biomaterial(s) (e.g., natural and/or bioengineered tissues, such as bioengineered constructs) may also undergo a slow cooling process (for example, while the bio-material(s) is/are comprised in the cassette of the present disclosure), optionally after the rapid cooling process, in which the biomaterial(s) may be cooled at an average rate less than 30° C. per minute, such as at an average rate less than 10° C. per minute to a predetermined storage tempera-ture above the glass transition temperature. The cooling process may be conducted at an average rate less than 5° C. per minute, or at about 3° C. per minute. In embodiments, the rate of cooling during this entire slow cooling step does not increase above 30° C. per minute, such as a rate of cooling that does not increase above 10° C. per minute, or a rate of cooling that does not increase above 5° C. per minute. In embodiments, cooling rates (for single or multi-step cooling processes) include, for example, cooling rates in the range from about 0.5 to about 10° C./min, such as about 2 to about 8° C./min, or about 4 to about 6° C./min. In embodiments, the process is independent of cooling rate as long as ice formation is avoided. The temperature to which the biomaterial(s) is/are cooled during this slow cooling process is between about −110° C. and about −180° C., or between about −125° C. and about −145° C., or about −135° C.

In embodiments, a slow cooling rate is achieved by changing the environment in which the container containing the solution is placed.

In some embodiments, a rapid cooling rate is achieved with the aid of an additional liquid, such as 2-methylbutane, which optionally has been pre-cooled. Then, to achieve the slow cooling rate, the container (for example, the cassette of the present disclosure) is removed from the liquid and cooled further to the final storage temperature in a gaseous environment.

The biomaterial(s) (e.g., natural and/or bioengineered tissues, such as bioengineered constructs) may be stored (for example, while the biomaterial(s) is/are comprised in the cassette of the present disclosure) for predetermined period of time at a temperature less than −20° C., but below the glass transition temperature. For example, after the above-mentioned cooling processes, the biomaterial(s) may be stored at temperature between about −110° C. and about −180° C., or between about −125° C. and about −145° C., or about −135° C.

In some embodiments, the methods may further comprise transporting step, wherein the biomaterials (e.g., natural and/or bioengineered tissues, such as bioengineered con-structs) is/are transported (for example, while the biomate-rial(s) is/are comprised in the cassette of the present disclo-sure). In embodiments, the biomaterial(s) is/are transported at a temperature between the glass transition temperature of the final full strength solution and −20° C., such as about 20° C. to 80° C. above the glass transition temperature of the full strength cryoprotectant solution, such as solution with a cryoprotectant concentration of ≤70% by weight cryopro-tectant, or 40° C. to 60° C. above the glass transition temperature of the predetermined full strength cryopro-tectant solution with, such as solution with a cryoprotectant concentration of ≤70% by weight cryoprotectant. For example, the biomaterial(s) may be transported on dry ice at about −79.6° C.

After storage the biomaterial(s) (e.g., natural and/or bio-engineered tissues, such as bioengineered constructs) may be removed from the predetermined full strength cryopro-tectant solution. Methods for removing the biomaterial(s) from the predetermined full strength cryoprotectant solution may comprise slowly warming the biomaterial(s) (for example, while the biomaterial(s) is/are comprised in the cassette of the present disclosure) in the predetermined full strength cryoprotectant solution to warmer temperature in the range between −20° C. and the glass transition tempera-ture of the cryoprotectant solution. A slow warming rate below 50° C. per minute may be used to warm the bioma-terial(s) in the predetermined full strength cryoprotectant solution. In embodiments, the average warming rate during this stage may be from about 10-40° C. per minute, such as from about 25-35° C. per minute. In addition, the tempera-ture to which the stored biomaterial(s) is/are slowly warmed may be between about −30° C. and −80° C., such as between about −45° C. and −65° C.

After the biomaterial(s) (e.g., natural and/or bioengi-neered tissues, such as bioengineered constructs) has under-gone this optional slow warming process, the biomaterial(s) may then be rapidly warmed to a temperature above −20° C. (for example, while the biomaterial(s) is/are comprised in the cassette of the present disclosure). In embodiments, the temperature should be sufficiently high that the solution is sufficiently fluid that the biomaterial(s) may be removed therefrom. The rapid warming process may be conducted at a rate above about 80° C. per minute, such as above about 100° C. per minute. The average warming rate during this step may be from about 200-300° C. per minute, such as from about 215-250° C. per minute. In embodiments, the biomaterial(s) may be warmed to a temperature above about −20° C., such as above about −10° C., or to a temperature above about −5° C., such as between about −5° C. and about 5° C. In embodiments, the process is independent of warming rate as long as ice formation is avoided.

In embodiments, the rapid warming rate may be achieved by changing the environment in which the container containing the solution is placed. In embodiments, the slow warming rate may be achieved by placing the container (for example, the cassette of the present disclosure) in a gaseous environment at a temperature above the temperature at which the biomaterial(s) (e.g., natural and/or bioengineered tissues, such as bioengineered constructs) has/have been stored. Then, to achieve the rapid warming rate, the container may be placed in the coil of an inductive heating system or in a liquid, such as an aqueous solution of, for example, dimethyl sulfoxide (DMSO), at a temperature above −75° C., such as above 0° C., or at normal atmospheric temperatures.

In embodiments, after the biomaterial(s) (e.g., natural and/or bioengineered tissues, such as bioengineered constructs) has/have been warmed to a temperature above −65° C., the concentration of the cryoprotectant in the solution may be reduced in a gradient or stepwise manner (for example, while the biomaterial(s) is/are comprised in the cassette of the present disclosure), for example, by reversing the steps described above for increasing the concentration of the cryoprotectant. For example, in embodiments, the biomaterial(s) in which the cryoprotectant concentration is to be reduced may be immersed in (or exposed to) a solution in which the cryoprotectant concentration of the solution is may be gradually decreased, such as a by use of a linear or nonlinear concentration gradient, to achieve a substantially cryoprotectant-free solution or cryoprotectant-free solution. In embodiments, the concentration gradient is a linear or nonlinear concentration gradient in which a solution having a cryoprotectant concentration of predetermined full strength cryoprotectant solution, such as solution with a cryoprotectant concentration of ≤70% by weight cryoprotectant, is gradually replaced with a cryoprotectant-free solution.

In embodiments, the cryoprotectant concentration is reduced in a step-wise manner (for example, while the biomaterial(s) (e.g., natural and/or bioengineered tissues, such as bioengineered constructs) is/are comprised in the cassette of the present disclosure). In embodiments, decreasing the cryoprotectant concentration of the tissue may be achieved by immersing the tissue in a series of decreasing cryoprotectant concentration solutions to facilitate elution of cryoprotectants from the tissue. The solutions are generally at a temperature above about −15° C., such as between about −15° C. and about 15° C., or between about 0° C. and about 10° C.

In embodiments, the cryoprotectant concentration may be reduced to achieve a particular plateau, which may be maintained for a predetermined period of time, such as a predetermined period of time that is in the range of from 3 to 10 minutes, or a predetermined period of time in the range of from 4 to 6 minutes, or a predetermined period of time of about 5 minutes. In some embodiments, the cryoprotectant concentration may be reduced to achieve a particular plateau, which may be maintained for a sufficient time to achieve approximate osmotic equilibration.

Then, the cryoprotectant concentration may be further reduced, which may or may not provide for a cryoprotectant-free solution. If not, optionally after maintaining the concentration for sufficient time to achieve approximate osmotic equilibration, the cryoprotectant concentration may be again further reduced in one or more steps to eventually provide a cryoprotectant-free solution. In embodiments, the tissue may be immersed in each solution for a predetermined period of time, such as a predetermined period of time that is in the range of from 3 to 10 minutes, or a predetermined period of time in the range of from 4 to 6 minutes, or a predetermined period of time of about 5 minutes.

To decrease the cryoprotectant concentration, the cryoprotectant solution may be mixed with a solution of a type similar to the cryoprotectant-free solution utilized in adding cryoprotectant to the biomaterial(s) (e.g., natural and/or bioengineered tissues, such as bioengineered constructs). The solution may also comprise at least one osmotic buffering agent.

As used herein, "osmotic buffering agent" means a low or high molecular weight non-penetrating extracellular solute that counteracts the osmotic effects of the greater intracellular than extracellular concentrations of cryoprotectant during the cryoprotectant efflux process.

As used herein "non-penetrating" means that the great majority of molecules of the chemical do not penetrate into the cells of the biomaterial(s) (e.g., natural and/or bioengineered tissues, such as bioengineered constructs) but instead remain in the extracellular fluid of the biomaterial(s).

As used herein, "low molecular weight" refers, for example, to a relative molecular mass of 1,000 daltons or less. As used herein, "low molecular weight osmotic buffering agents" have a relative molecular mass of 1,000 daltons or less. Low molecular weight osmotic buffering agents include, for example, maltose, potassium and sodium fructose 1,6-diphosphate, potassium and sodium lactobionate, potassium and sodium glycerophosphate, maltopentaose, stachyose, mannitol, sucrose, trehalose, glucose, maltotriose, sodium and potassium gluconate, sodium and potassium glucose 6-phosphate, and raffinose. In embodiments, the low molecular weight osmotic buffering agent is at least one of mannitol, sucrose, trehalose and raffinose.

As used herein, "high molecular weight" refers, for example, to a relative molecular mass of from greater than 1,000 to 500,000 daltons. As used herein, "high molecular weight cryoprotectant and osmotic buffering agents" generally have a relative molecular mass of from greater than 1,000 to 500,000 daltons. High molecular weight osmotic buffering agents include, for example, hydroxyethyl starch (HES), polyvinylpyrrolidone (PVP), raffinose undecaacetate (>1,000 daltons) and Ficoll (greater than 1,000 to 100,000 daltons). In embodiments, the high molecular weight osmotic buffering agent is HES, such as HES having a molecular weight of about 450,000.

The cryoprotectant-free solution may contain less than about 500 mM of an osmotic buffering agent, such as from about 200 to 400 mM osmotic buffering agent. As the osmotic buffering agent, a low molecular weight osmotic buffering agent may be used. In embodiments, the low molecular weight osmotic buffering agent is mannitol.

In embodiments, the cryoprotectant may be removed in a series of steps such as three, four, five, six, seven, etc. steps. In embodiments, the cryoprotectant may be removed in a series of seven steps, where in step 1, the biomaterial(s) (e.g., natural and/or bioengineered tissues, such as bioengineered constructs) may be exposed to a cryoprotectant solution with a concentration that may be about 40 to about 70%, such as about 45 to about 55%, of the highest cryoprotectant concentration used; in a step 2, the biomaterial(s) may be exposed to a cryoprotectant concentration that may be about 30 to about 45%, such as about 35 to about 40%, of the highest cryoprotectant concentration used; in step 3, the biomaterial(s) may be exposed to a cryoprotectant concentration that may be about 15 to about 35%, such as about 20 to about 30%, of the highest cryoprotectant concentration used; in step 4, the biomaterial(s) may be exposed to a cryoprotectant concentration that may be about 5 to about 20%, such as about 10 to about 15%, of the cryoprotectant concentration used; and in step 5, the biomaterial(s) may be exposed to a cryoprotectant concentration that may be about 2.5 to about 10%, such as about 5 to about 7.5%, of the cryoprotectant concentration used. In the above steps, the remainder of the solution may be cryoprotectant-free solution containing osmotic buffering agent. In step 6, essentially all of the cryoprotectant may be removed and the osmotic buffering agent may be retained. In step 7, the osmotic buffering agent may be removed. In embodiments, steps 6 and 7 may be combined in a single step. For example, the osmotic buffering agent may be removed at the same time as the remainder of the cryoprotectant. In embodiments, if no osmotic buffering agent is used or if it is not removed, step 7 can be eliminated. Each of these concentration steps may be maintained for a sufficient time to achieve approximate osmotic equilibration, such as about 10 to 30 minutes, or 15 to 25 minutes. In some embodiments, each of the concentration steps may be maintained for about 4 to 6 minutes, or about 5 minutes. In embodiments, the cryoprotectant is removed in one or more washes employing a cryoprotectant-free solution.

The temperature of the series of solutions used for removing the cryoprotectant from the biomaterial(s) (e.g., natural and/or bioengineered tissues, such as bioengineered constructs) may be above about –15° C., such as between about –15 and about 15° C., or between about 0° C. and about 37° C. In embodiments, step 1 may be started when the biomaterial(s) is/are at a temperature above about –75° C., such as above –65° C. In embodiments, the temperature of the biomaterial(s) may be below the temperature of the solution in which it is immersed in step 1, and the materials(s) may be further warmed to a temperature above about –15° C. during step 1 of the cryoprotectant removal.

The cryoprotectant-free solution employed for washing of the biomaterial(s) (e.g., natural and/or bioengineered tissues, such as bioengineered constructs) may be sterile water, a physiological salt solution (for example saline, Hank's Balanced Salt Solution, Lactated Ringers Solution or Krebs-Henseliet Solution) or tissue culture media (for example Roswell Park Memorial Institute media, Dulbecco's Modified Eagle's Medium (DMEM), Eagle's Medium or Medium 199) employed for tissues, such as mammalian cells.

The number of washes, volume of each wash and duration of each wash may vary depending upon the individual biomaterial mass and the final residual chemical concentrations desired. In embodiments, the last wash (rinse) may be in a commonly employed medical salt solution, such as saline or Ringers Solution.

In some embodiments, the above methodology of the present disclosure may be conducted in vials or deep-well plates. Alternatively, the above methodology of the present disclosure may be conducted in the specially designed cassette of the present disclosure, which has been made to be suitable for use in a vitrification process. The cassette of the present disclosure can be used as a part of a high throughput system that can preserve multiple biomaterials (e.g., natural and/or bioengineered tissues, such as bioengineered constructs) at once.

The biggest hurdle in preserving multiple constructs at one time is the ability to produce and maintain adequate cooling and rewarming rates such that ice formation is prevented. Earlier studies relating to cryopreserving cells on plates revealed that the configuration of the system can have a significant impact on the ability to cool and warm without ice formation. Initially, it was thought that vitrification of constructs could be done using multi-well culture plates (similar to that which the constructs are generally shipped to end users).

However, the design of such plates makes them hard to use for low temperature (i.e., cryogenic temperatures) storage. The design of conventional multi-well culture plates makes it difficult to place in cooling and warming baths without the bath contents wicking into the wells. Deep well plates can accommodate larger volumes and also are designed so that the dangers of wicking into the wells were alleviated.

The above methodology of the present disclosure has been used for the successful vitrification of 6 constructs at one time using the deep well plates. However, vitrification of greater than 6 constructs at once demonstrated reduced viability due to prolonged exposure to CPAs causing cytotoxicity.

In embodiments, the deep well plate for use with the methodology of the present disclosure should be made from a different plastic compared with traditional tissue culture plates (i.e., polypropylene versus polystyrene). Polypropylene proved to be more amenable to vitrification and cold temperatures by providing better conductivity for cooling and warming the biomaterials (e.g., natural and/or bioengineered tissues, such as bioengineered constructs). More consistent and faster cooling and warming rates were achieved.

In some embodiments, the above methodology of the present disclosure may be conducted in the specially designed cassette of the present disclosure, which has been made to be suitable for use in a vitrification process. The cassette of the present disclosure can be used as a part of a high throughput system that can preserve multiple biomaterials (e.g., natural and/or bioengineered tissues, such as bioengineered constructs) at once.

For example, the above methodology of the present disclosure may be conducted in cassette designed to hold 24 biomaterial samples (e.g., natural and/or bioengineered tissues, such as bioengineered constructs) in well inserts in place while providing enough space and access for the biomaterials to be exposed to the vitrification solution. This cassette is configured such that is can be moved around as one unit which makes the load/unload steps more seamless with less time between steps. Furthermore, the configuration of the inserts within the cassette may be set up to mimic the configuration of wells in a 24 well plate so that deposition of the inserts into the cassette and back to a plate after rewarming can also be seamless and not require handling of individual biomaterials (this is particularly advantageous over protocols that would requires moving each biomaterial individually, which limits how many individual biomaterials can be vitrified at one time). The pieces of the cassette may be easily modified for other types of native/natural tissue and/or bioengineered constructs and is also highly amenable to being used in an automated setting that could process, vitrify and rewarm multiple biomaterial samples (the term biomaterial(s) and biomaterial sample(s) are used inter-changeable herein) as one unit.

Such a cassette may have two parts (e.g., a top and a bottom) that fit together to hold a predetermined amount of well inserts (while the exemplary embodiment depicted and described below has 24 well inserts, the predetermined amount of well inserts may be in the range of from 6 to 384, such as from 12 to 192, or 24 to 96, or 24 to 48). The top has place holders to keep the inserts in place in a configuration that is compatible with a predetermined well arrangement, such as a well arrangement of a 24 well plate. This configuration facilitates moving each of the biomaterial samples from the cassette to a multiwell plate as needed. Holes may be present in both parts of the cassette to allow the vitrification solution to easily flow through and around each insert and biomaterial, so the cassette can be submerged in the vitrification solution for CPA load/unload steps and during actual vitrification. In embodiments, the place holders may be easily modified to hold pieces of native tissue for preservation as well.

In embodiments, the cassette may be configured such that the entire vitrification process may be automated. The cassette of the present disclosure, which may hold numerous biomaterial samples (e.g., natural and/or bioengineered tissues, such as bioengineered constructs) at a time (such as up to 384 biomaterials at a time, or 24 biomaterials at a time as depicted below) allows processing of multiple samples for off-the-shelf commercial use in a reproducible manner. The use of the cassette of the present disclosure allows for improvements in the vitrification methodology by reducing handling errors and increasing product quality, while being able to realistically process batches of constructs and/or tissues at a higher level of precision while guaranteeing a high level of viability for each specimen for banking.

Such an exemplary cassette of the present disclosure is illustrated below in FIG. 1. FIG. 1 shows an exemplary cassette (100) having first part (102) and a second part (104) that are configured to fit together via a releasable locking means in which one or more spaces in sidewall (118) of the second part are configured to receive one or more projecting structures (106) of the second part (104). Holes (108, 116) are present in both the first part (102) and the second part (104) of the cassette (100) to allow a fluid (e.g., such as a vitrification formulation or a solution used during the vitrification process) to easily flow through the cassette (100). The second part (104), which may be the top of the cassette (100), has place holders (110) to keep inserts (see (120) of FIG. 2) in place in a configuration that is compatible with the well arrangement of a well plate (not shown). This configuration facilitates moving the biomaterial samples from the cassette to plate as needed.

Figure 2A:
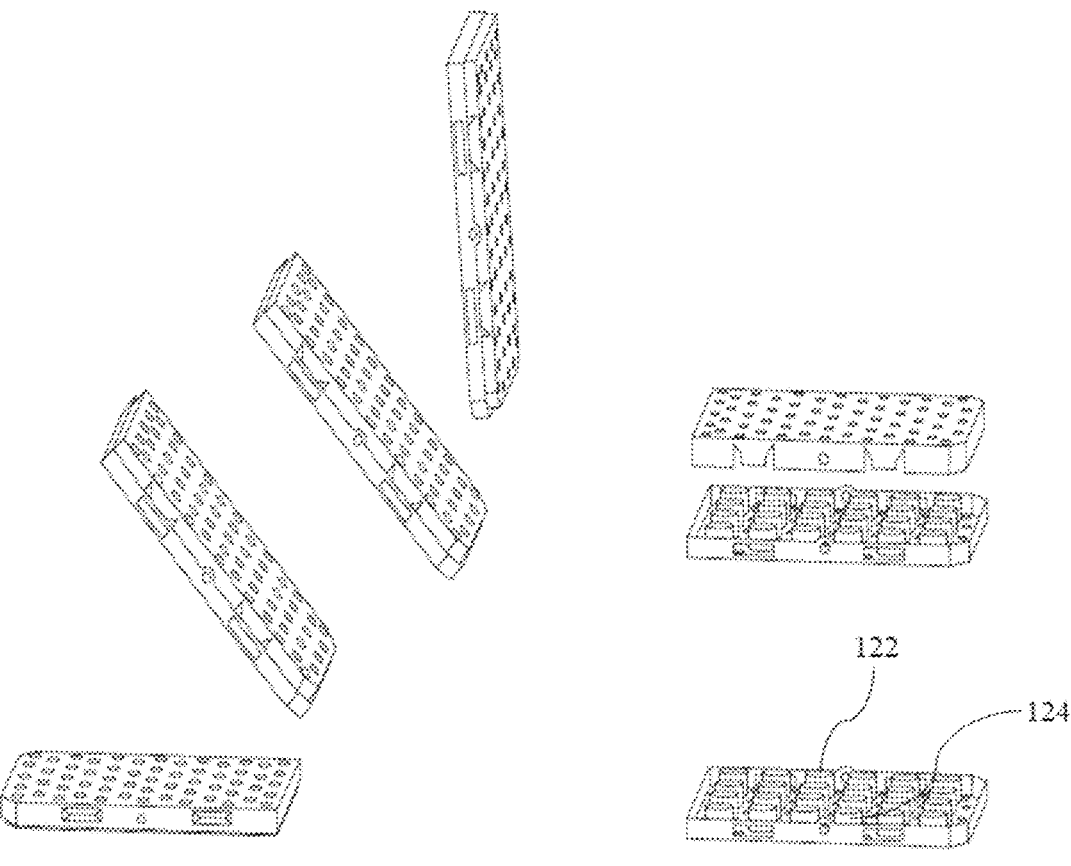
FIG. 2A illustrates a schematic view of a cassette according to an embodiment as one piece and how biomaterials fit into the cassette.
Figure 2B:
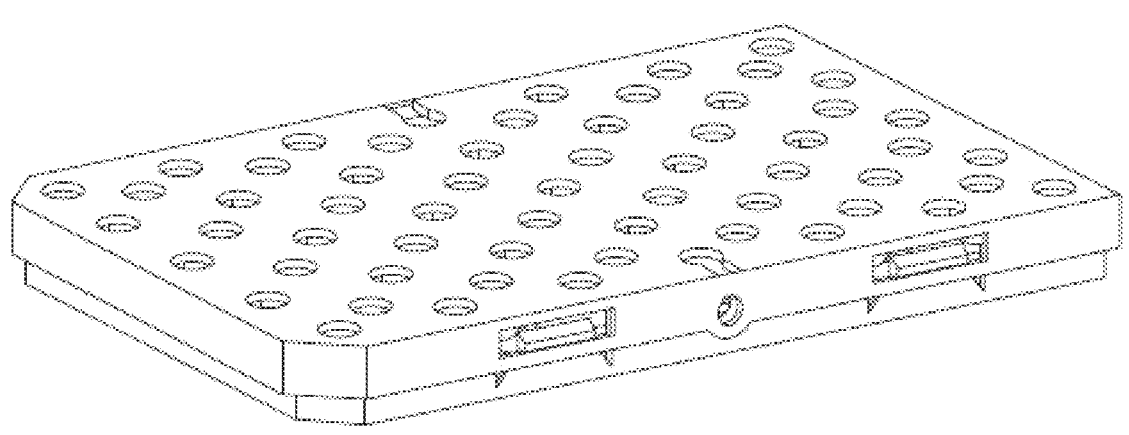
FIG. 2B illustrates a side view of the cassette in FIG. 2A in a closed position.
Figure 2C:
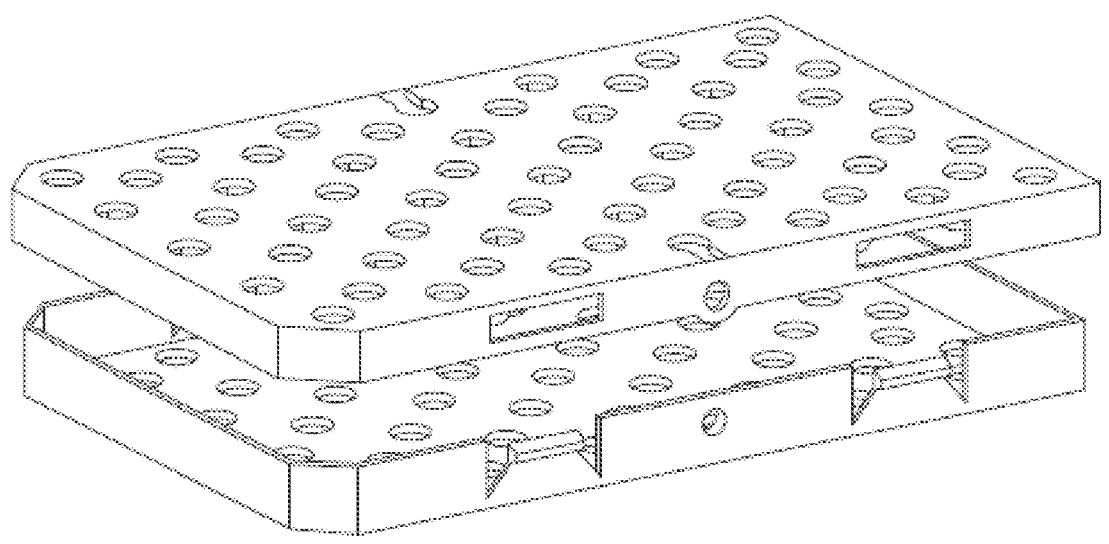
FIG. 2C illustrates a side view of the cassette in FIG. 2B with a lid off.
Figure 2D:
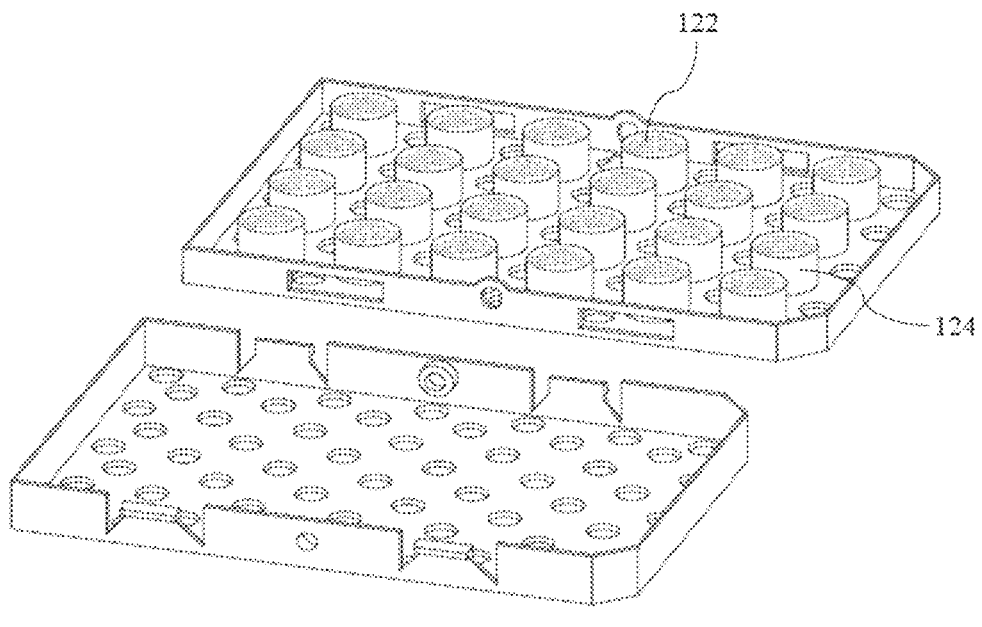
FIG. 2D illustrates a side view of the cassette in FIG. 2B with two sides of the cassette with biomaterial samples placed on one side.
Figure 2E:
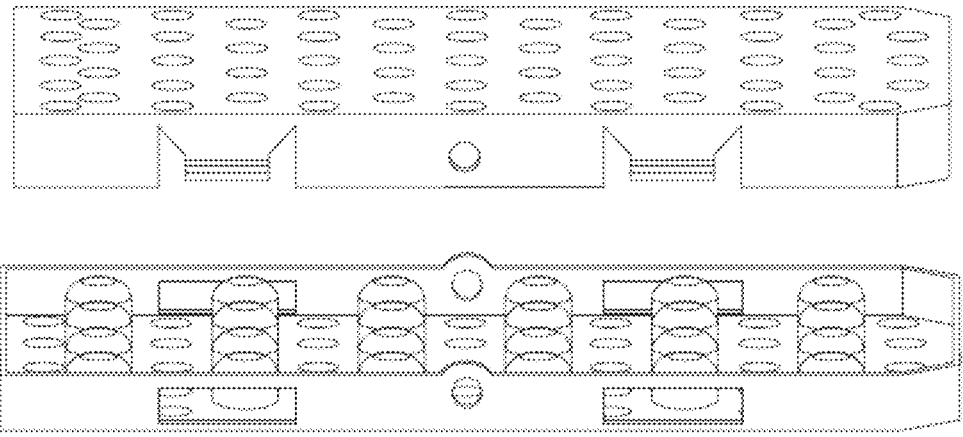
FIG. 2E illustrates a side view of both sides of the cassette in FIG. 2D.

FIG. 2A depicts an exemplary cassette as one piece and illustrates how biomaterials (122) in inserts (124) fit into the cassette. FIG. 2B illustrates a side view of the cassette closed. FIG. 2C illustrates a side view of cassette with lid off. FIG. 2D illustrates the two sides of the cassette with biomaterial samples placed on one side and FIG. 2E illustrates a side view of both sides of the cassette.

As shown in FIGS. 2A and 2D, holes (108, 116) are present in both the first part (102) and the second part (104) of the cassette (100) to allow a fluid (e.g., such as a vitrification formulation or a solution used during the vitrification process) to easily flow through the cassette and around each insert (124) and biomaterial (122).

Figure 3:
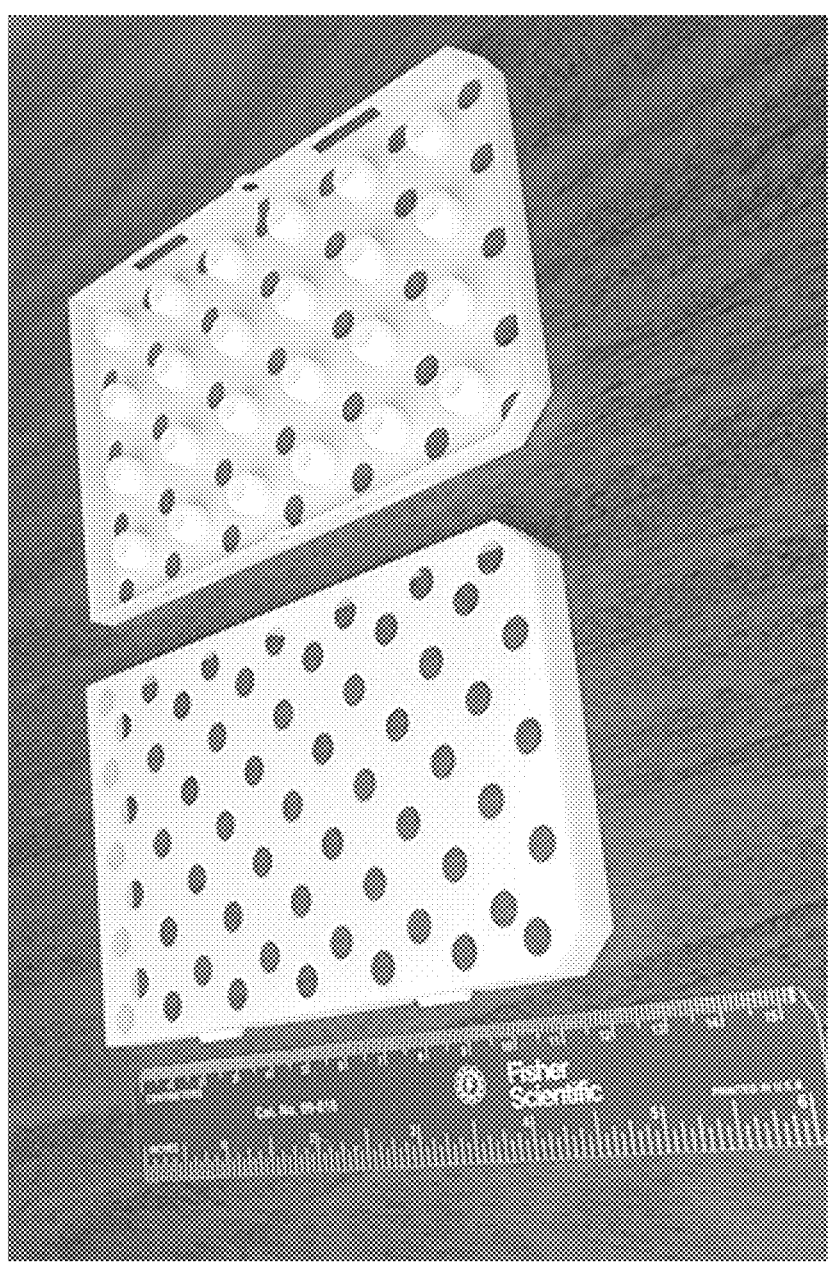
FIG. 3 is a photograph of a cassette according to an embodiment.

FIG. 3 is a photograph of an exemplary cassette showing the relative relationships of the parts of the exemplary cassette. This cassette has two parts, both with holes to allow solution to reach the biomaterial easily. The lid contains round place holders to keep the well insert containing the biomaterials in place within the cassette.

In some embodiments, the cassettes of the present disclosure may be made from plastics, such as those traditionally used for the production of labware for research and medical purposes, in particular, plastic formulations that can withstand cryogenic temperatures and exposure to chemicals used in the vitrification process. In some embodiments, the plastic may be a polypropylene or teflon.

The cassettes of the present disclosure may be reusable or disposable.

The cassettes of the present disclosure may be manufactured using conventional methods, such as, for example, injection molding.

The cassettes of the present disclosure may alternatively be produced using reaction injection molding technologies, in which prepolymers are injected into the mold instead of using molten polymeric materials. After injection, the prepolymers polymerize and cure to form the completed parts of the cassettes of the present disclosure. In addition, since prepolymers are generally less viscous than molten polymers, they may flow more easily into molds, reducing tooling costs.

In some embodiments, the cassettes of the present disclosure may be a reusable or disposable multi-sample cassette comprising a first part and a second part that are configured to fit together via a releasable locking mechanism, the second part comprising one or more inserts and a plurality of place holders, each place holder of the plurality of place holders being configured to receive one of the one or more inserts, wherein each of the one or more inserts comprising at least one bioengineered construct or natural tissue sample, the first part and the second part comprise a plurality of apertures configured to allow a solution to flow through and around each of the one or more inserts and the at least one bioengineered construct or natural tissue sample, and the configuration of the place holders within the cassette is set up to mimic the configuration of wells in a plate having a predetermined number of wells, predetermined number of wells being in the range of from 6 to 384 wells.

In embodiments, the releasable locking mechanism may be that depicted above and/or a mechanism in which engaging the releasable lock components relies on the initial spatial deflection of at least one element of a lock component. These may be, for example, a bayonet tab with a detent engaging against a mating element of the other lock component, followed by spatial re-deflection of the at least one element so that it catches one or more elements of the other lock component. The detent and mating component are adapted to be releasable by making the detent relatively small so that the amount of force required to release it from the mating feature is small. The mating component may be a bar or the edge of an opening into which the bayonet tab can protrude.

Alternative methods of releasably connecting the first part and the second part include, for example, the use of balls and sockets wherein a ball component will mate with a socket that is slightly smaller than the diameter of the ball. Like the tab and detent system, the application of manual force to urge the ball into the socket will deform one or both components and allow them to pass beyond one another to a first locking position. The locking elements may be arranged along the outer edge of the first part and second part. In the case of a large reusable or disposable multi-sample cassette (e.g., containing 384 wells), multiple large locks may deployed along each side to help to ensure that the first part and the second part stay fastened together. In some embodiments, when the releasable lock is moved to its final, locking position with a second and third locking elements may be engaged, a space is created between the engaged locking elements and the lid or tray. The space may be varied in size by the proper sizing of the locking elements and/or for providing a handle for manual manipulation of the reusable or disposable multi-sample cassette.

In embodiments, the first part may have a frame having a predetermined thickness, such as a thickness in a range of from about 0.5 to about 3 mm, or from about 1 to about 2 mm, or from about 1.3 to about 1.8 mm, or from about 1.4 to about 1.6 mm. In embodiments, the second part may have a frame having a predetermined thickness, such as a thickness in a range of from about 0.5 to about 3 mm, or from about 1 to about 2 mm, or from about 1.3 to about 1.8 mm, or from about 1.4 to about 1.6 mm.

In embodiments, each aperture (which may be in the form of any desired shape, such as a circle or hexagon) of the plurality of apertures may have a diameter in a range of from about 3 to about 7 mm, or from about 4 to about 6 mm, or from about 4.5 to about 5.5 mm, or from about 4.8 to about 5.2 mm. In addition, each aperture of the plurality of apertures may be spaced from the nearest adjacent aperture by a predetermined distance, such as a distance in the range of from 3 to 15 mm, or from about 5 to about 12 mm, or from about 7 to about 10 mm, or from about 8 to about 9 mm. In some embodiments, the diameter of each aperture of the plurality of apertures is the same on both the first and second parts. In other embodiments, the diameter of each aperture of the plurality of apertures on the first part is different from the diameter of each aperture of the plurality of apertures on the first part.

In some embodiments, the area inside the cassette (when the first and second parts are engaged) may be set to a predetermined area, such as an area in the range of from about 89 $cm^2$ to about 101 $cm^2$, or from about 92 $cm^2$ to about 98 $cm^2$, or from about 94 $cm^2$ to about 96 $cm^2$, or from about 94.5 $cm^2$ to about 95.5 $cm^2$.

In some embodiments, the volume of the entire interior chamber of the reusable or disposable multi-sample cassette (when the first and second parts are engaged) may be in the range of from about 81 $cm^3$ to about 98 $cm^3$, or from about 86 $cm^3$ to about 95 $cm^3$, or from about 89 $cm^3$ to about 92 $cm^3$.

In some embodiments, the volume of each one bioengineered construct or natural tissue sample contained in the cassette may be in the range of from about 1 $cm^3$ to about 1.5 $cm^3$, or from about 1.1 $cm^3$ to 1.4 $cm^3$, or from about 1.1 $cm^3$ to 1.3 $cm^3$. Such one bioengineered constructs or natural tissue samples may be fixed/immobilized on a surface of the one or more inserts by conventional methods known to those skilled in the art.

In some embodiments, the first part and/or the second parts may be disposable or reusable. In is regard, the first part and/or the second parts or a portion thereof can be made from a plastic material, such as, but not limited to, one or more thermoplastic polymers, including polyolefins such as polyethylene and/or copolymers thereof, including low density, high density, linear low density, or ultra low density polyethylenes, polypropylene and/or polypropylene copolymers, including atactic polypropylene; isotactic polypropylene, syndiotactic polypropylene, and/or combinations thereof can also be used, or polybutylene. In other embodiments, the disposable or reusable first part and/or the second parts can be made from glass, or ceramic materials, and the like.

In some embodiments, the first part and second parts may be formed from medical grade material, such as a medical grade polypropylene, polystyrene, or Teflon or other medical grade plastic materials. The first part and second parts can be formed from a transparent or translucent plastic material, or contain transparent or translucent portions (made of medical grade polypropylene, polystyrene, or Teflon or other medical grade plastic materials), so that a user or operator can observe one or more of the biomaterials contained therein. In such embodiments, only select portions of the first part and/or second parts may be transparent or translucent, and other portions of the first part and second parts are formed from an opaque reflective material.

In embodiments, the disclosure provides an apparatus (such as a perfusion apparatus) for supplying the above-mentioned solutions to the cassette of the present disclosure. The perfusion apparatus comprising at least one solution source well in fluid communication with the inner chamber of the cassette of the present disclosure (which comprises the biomaterials (e.g., natural and/or bioengineered tissues, such as bioengineered constructs) that controllably provides a source of the respective solution to fresh media to the one chamber comprising the biomaterial(s); and a waste well in fluid communication with the chamber of the cassette that controllably receives waste media and/or fluid that flows out of the cassette.

Specific and preferred values disclosed for components, ingredients, additives, dimensions, conditions, and like aspects, and ranges thereof, are for illustration only; they do not exclude other defined values or other values within defined ranges. The apparatus and methods of the disclosure can include any value or any combination of the values, specific values, more specific values, and preferred values described herein, including explicit or implicit intermediate values and ranges.

Examples

Methods

Tissue Culture: Human epidermal models were obtained from commercial sources and maintained according to their specifications. All constructs were incubated in appropriate media for 24 hours under physiological tissue culture conditions before initiating experiments. Fresh controls were used in each experiment and experimental treatment groups were assessed over 4-5 days post-rewarming.

Vitrification Methods: The constructs were gradually infiltrated with precooled vitrification formulations at 4° C. in six steps with 0%, 12.5%, 25%, 50%, 75% and 100% of each formulation to achieve a final cryoprotectant concentration. After rewarming, the vitrification solution was removed in seven sequential steps at 4° C. into culture medium as previously described (see Song et al., Vitreous cryopreservation maintains the function of vascular grafts, Nature Biotechnology, 8(3):296-9, Epub 2000/03/04, doi: 10.1038/73737, PubMed PMID: 10700144 (2000); and Song et al., Vitreous Preservation of Rabbit Articular Cartilage, Cell Preservation Technology, 2 (1); 67-74 (2004)).

Once loaded with vitrification solution the construct can be cooled to storage temperature and rewarmed using several methods. (1) The constructs were placed in glass scintillation vials (Diam.×H, 25 mm×60 mm) containing 1.5 mL of pre-cooled vitrification solution with 0.3 mL solution inside the well insert. Then 1 mL of 2-methylbutane (iso-pentane, freezing point: −160° C., density: 0.62) was placed on top of the vitrification solution in the vial and 0.2 mL inside the well insert at 4° C. to prevent direct air contact. Samples were cooled rapidly (approximately 45° C./minute) to −100° C. by placing the samples in a pre-cooled bath containing isopentane in a −135° C. mechanical storage freezer. Upon achieving −100° C. the specimens were removed from the bath and stored at −135° C. in the mechanical storage freezer, which results in slow cooling (3° C./minute) to −135° C. The samples were held at −135° C. for a minimum of 24 hours. The constructs were rewarmed in two stages, first, slow warming to −100° C. (approximately 30° C./minute) at the top of the mechanical storage freezer and then rapidly warmed to either 0° C. or ±−10° C. approximately 225° C./min) in a 30% ME₂SO bath at room temperature. (2) The constructs in inserts are placed within the well of a deep well plate. There is 0.6 mL vitrification solution in the well and 0.2 mL solution in the insert. To cool the plate, it is placed in a shallow pre-cooled bath containing isopentane in a −135° C. mechanical storage freezer for about 5 minutes, then the plate is removed from the bath and left in the −135° C. mechanical storage freezer for slow cooling to −135° C. and storage. For rewarming, the plate is removed from the freezer and left at room temperature to slowly rewarm the samples to about −100° C. then rapid rewarming was achieved by placing the deep well plate in a 30% ME₂SO bath at room temperature until the samples are no longer vitrified. (3) The last method involves placing the constructs in inserts into a specially made cassette. Once the loading steps are done the cassette is placed into a pouch containing the about 150 mL vitrification solution and sealed using a bag sealer to remove any air. The bag is then placed in a pre-cooled bath containing isopentane in a −135° C. mechanical storage freezer overnight. The next day, the bag is removed from the bath and stored at −135° C. For rewarming, the bag containing the cassette is placed at −80° C. for 15-25 minutes for slow cooling and then rapidly warmed by submerging the bag in a water bath at about 40° C. until the sample is no longer vitrified.

Viability Assays

Resazurin Assay: Was used to measure the metabolic activity and has the advantage of being non-toxic so constructs can be assessed before and several times after treatment. Resazurin dye (alamarBlue) was used to assess cell viability by measuring the oxidation/reduction reactions that take place within cells. The dye is added directly to the culture wells and the plates were incubated for 3 hours at 37° C. Upon reduction, the dye changes color and this was measured and quantified using a fluorescent microplate reader at an excitation wavelength of 544 nm and an emission wavelength of 590 nm.

M11 Assay: Was also used to measure metabolic activity. This assay was included because this is the most common assay used for assessment of skin-equivalent viability. The MTT [3-(4,5-dimethylthiazol-2-yl)-2,5-diphenyltetrazolium bromide] assay is based on the ability of a mitochondrial dehydrogenase enzyme from viable cells to cleave the tetrazolium rings of the pale yellow MTT and form a dark blue formazan crystals which accumulate within healthy cells. Solubilization of the cells by detergent results in the liberation of the crystals that are solubilized. The number of surviving cells is directly proportional to the level of the formazan product created and can be quantified using a simple colorimetric assay read on an absorbance reader.

Dose Response Assay: (Functional End Point Assay Required by MatTek for Quality Assurance): The dose response assay was performed according to the manufacturer's instructions. Fresh tissues were used the following day for Triton Dose Response assay, with vitrified groups being vitrified the following day. The test begins with application of 100 μl of %1 TritonX-100 at time intervals of 4, 6, 8 and 12.5 hours. After Triton exposure, tissue constructs are rinsed with sterile PBS followed by immediate transfer to an MTT assay (see below) which is used to assess the cell viability of the construct. The assay meets the acceptance criterion if the ET-50 or 50% Viability levels fall with 4.77-8 hours for Epiderm or 12.2<ET-50<37.5 minutes for EpiOcular tissue.

IL-1α Release: IL-1α is an important regulator of immune and inflammatory responses. It is used in addition to the MTT assay to measure and predict the irritancy of substances being tested using epidermal models. IL-1α is released into the supernatant and so samples from fresh and cryopreserved epidermal constructs will be saved and the IL-1α will be measured using an EIA assay.

Figure 4:
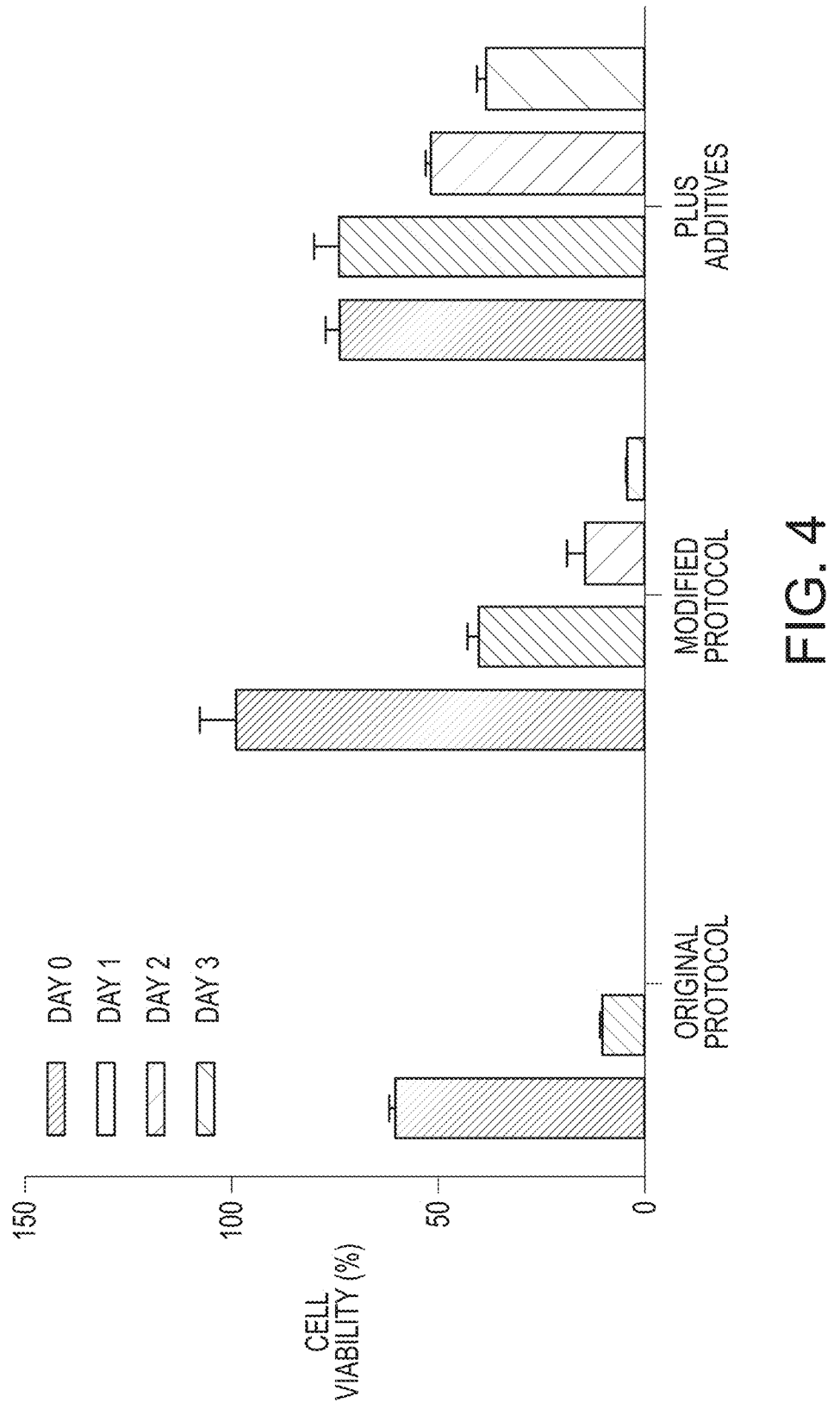
FIG. 4 is a chart illustrating viability of Epiderm constructs after protocol modifications according to disclosed examples.

The initial vitrification protocol was one that was developed for use with vein segments and rings. The process uses a 6 step (15-minute incubation) protocol to add the cryoprotectant (CPA) solution into the construct. The insert is then left in a glass scintillation vial in 1.5 mL vitrification solution with 0.3 mL solution inside the insert. The vials are cooled rapidly to −100° C. then slowly cooled to −135° C. where they are stored until rewarming. During rewarming, the samples are warmed slowly to −100° C. then rapidly to room temperature. The vitrification solution is removed using 7 sequential removal steps at 15 minutes each (FIG. 4, original protocol). Several changes were made to this protocol to produce better and sustainable viability for the Epiderm construct. Some of these modifications are listed in Table 1:

TABLE 1

| Protocol Modifications |
| --- |
| Load/unload strategy: |
| time of incubation, unloading mechanics |
| Vitrification solution formulation |
| Additives to culture medium: |
| Q-VD-OPH, α-tocopherol, ferrulic acid, |
| curcumin, allene oxide synthase, SDF-1 |

The simplest adjustment was a change to a different vitrification solution from VS55 for vessels to VS70 that contained different amounts of the same components; dimethyl sulfoxide (DMSO), propanediol (PD) and formamide (FD) (FIG. 4, modified protocol).

A series of changes were made to how the vitrification solution was loaded and unloaded from the construct. These changes included shorter incubation steps (5 minutes instead of 15), using a lower concentration of cryoprotectant to load the full-strength vitrification solution into the construct and also a more mechanical change that involved dilution of the full strength vitrification solution to half its concentration by a simple dilution step as opposed to removal from one solution to the next. This shortened the amount of time that the construct was exposed to the full-strength vitrification solution reducing potential cytotoxicity caused by exposure to the vitrification solution (modified protocol). Finally, the addition of an anti-oxidant, α-tocopherol (αT), and a caspase inhibitor, Q-VD-OPH (QVD) to the constructs in their culture medium before and after vitrification improved viability and also improved the maintenance of the viability for several days post rewarming (FIG. 1, plus additives).

Other additives were tried, but only QVD and αT demonstrated any significant improvement.

The arrived at protocol starts with an overnight incubation with αT and QVD. The next day, the constructs are vitrified using the 6-step addition protocol, 5 minutes each step, to add the cryoprotectant (CPA) solution into the construct. The insert is then left in the final vitrification solution with 0.3 mL solution inside the insert. The vials are cooled rapidly to −100° C. then slowly cooled to −135° C. where they are stored until rewarming. During rewarming, the samples are warmed slowly to −100° C. then rapidly to room temperature. The vitrification solution is removed using 7 sequential removal steps at 5 minutes each. The first removal step is a dilution of the final vitrification solution to 50% of its final concentration. Constructs are left in culture medium plus additives for at least 24 hours after rewarming to promote viability for at least 2-3 days post rewarming.

With a protocol more suitable to these 3D constructs in place, further exploration of an optimal vitrification solution was done. Although several issues that related to the sustained viability of the constructs were overcome, further improvements in viability that would be maintained for several days in culture post rewarming were sought.

Cytotoxicity was a primary concern because vitrification solutions have a high cryoprotectant concentration and the constructs are exposed to these compounds for extended periods during load/unload steps. The strategy that used lower cryoprotectant concentrations for load/unload steps while the vitrification solution would be at higher concentration (i.e., load/unload with VS55 but vitrify constructs in VS70) was pursued further. In this way, the constructs were exposed for extended periods to a lower overall cryoprotectant concentration and only briefly exposed to the full-strength solution at vitrification. A series of vitrification solutions with some variations in the load/unload strategy were evaluated (see Table 2).

This strategy was very effective and provided good viability right after rewarming but also sustained viability for up to 2 days post rewarming. The solution combinations that provided the best viability are bolded in Table 2 (above).

Figure 5:
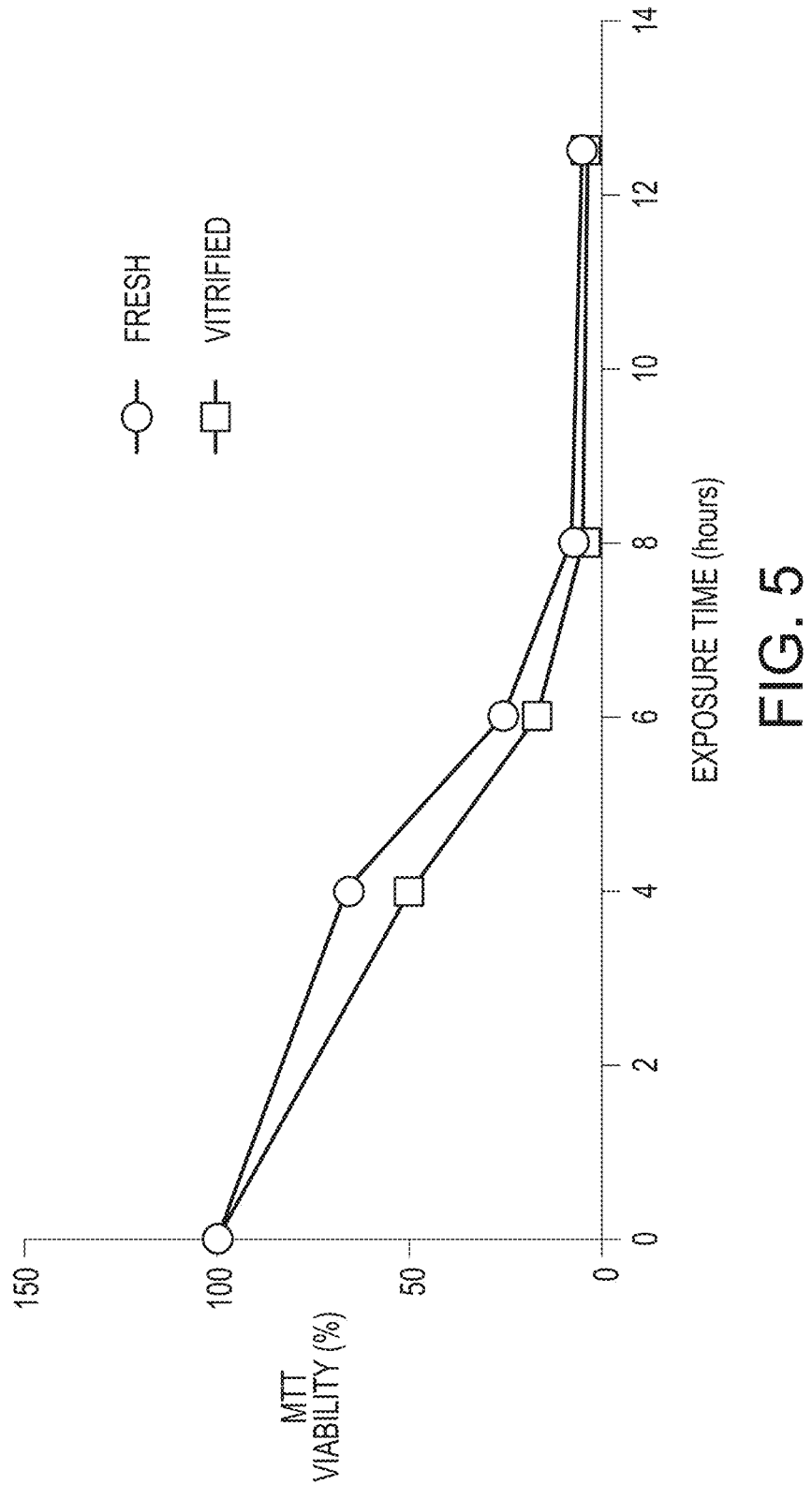
FIG. 5 is a chart illustrating viability of fresh and vitrified Epiderm after exposure to Triton-X100 according to disclosed examples.

Further testing on the Epiderm construct demonstrated that vitrified constructs reacted in a similar manner to the fresh control when subjected to toxicity testing using Triton-X100. The results are shown in FIG. 5.

Viability as measured using the MTT assay demonstrated similar viabilities when vitrified and fresh Epiderm constructs were exposed to Triton-X100 for up to 12.5 hours. Additional testing was done evaluating the release of IL-1α as compared to a fresh control. Several vitrification solutions were tested (see the samples marked with an * in Table 2) and IL-1α release seemed to be somewhat dependent on the load/unload vitrification solution combination used. Overall, release was comparable to fresh constructs that had been kept in culture for similar periods (See the results set forth in Table 3).

TABLE 3

| | IL1α release after vitrification | | |
|---|---|---|---|
| Solution | Day 0 | Day 1 | Day 2 |
| Fresh | 85.50 ± 6.26 | 43.03 ± 6.33 | 26.74 ± 8.27 |
| VS70 (VS55) | 181.86 ± 12.18 | 128.73 ± 52.82 | 343.92 ± 137.81 |
| VS70 (DP6) | 23.56 ± 5.22 | 217.88 ± 9.93 | 128.29 ± 5.10 |
| VS55 + sucrose (DP6) | 97.19 ± 12.75 | 129.22 ± 12.58 | 56.87 ± 2.15 |
| DP7 + sucrose (DP6) | 110.96 ± 9.89 | 131.99 ± 11.59 | 73.89 ± 1.68 |
| DP7 + trehalose (DP6) | 12.66 ± 0.77 | 2.03 ± 0.38 | 2.23 ± 0.42 |

TABLE 2

| | Construct viability using different vitrification solutions | | | |
|---|---|---|---|---|
| Load/unload solution | Vitrification Solution | container | Viability Day 0 | Viability Day 2 |
| VS55 | VS55 | vial | 90.2 ± 1.4 | 22.6 ± 1.8 |
| VS55 | VS55 + 15% glycerol | vial | 84.7 ± 10.6 | 26.7 ± 3.6 |
| VS55 | VS49 + 0.6M sucrose | vial | 73.9 ± 3.0 | 44.1 ± 2.9 |
| VS55 | VS70 + 0.6M sucrose | vial | 59.1 ± 3.6 | 24.7 ± 3.2 |
| VS55 | VS70 + 0.6M trehalose | vial | 54.0 ± 3.8 | 15.9 ± 5.0 |
| VS70 | VS70 | vial | 98.7 ± 9.2 | 13.6 ± 5.2 |
| DP6 | DP6 + 0.6M sucrose | vial | 70.8 ± 6.2 | 16.9 ± 5.5 |
| VS83 | VS83 | vial | 79.4 ± 4.2 | 0.6 ± 0.3 |
| *VS55 | VS55 + 0.6M sucrose | vial & plate | 93.5 ± 8.6 | 73.5 ± 3.6 |
| *VS55 | VS70 | vial & plate | 86.4 ± 6.7 | 80.9 ± 7.7 |
| VS49 | VS70 | plate | 80.3 ± 2.8 | 25.5 ± 2.9 |
| VS49 | VS55 + 0.6M sucrose | plate | 81.2 ± 4.4 | 25.5 ± 3.6 |
| *DP6 | VS55 + 0.6M sucrose | plate | 75.4 ± 10.3 | 52.3 ± 14.1 |
| DP6 | VS55 + 0.6M sucrose + trehalose | plate | 94.3 ± 3.1 | 62.8 ± 2.5 |
| DP6 | VS70 | plate | 86.2 ± 8.4 | 73.9 ± 8.6 |
| *DP6 | DP7 + 0.6M sucrose | plate | 76.2 ± 7.1 | 21.8 ± 3.7 |
| DP6 | DP7 + 0.6M trehalose | plate | 84.1 ± 5.6 | 36.3 ± 8.3 |
| *DP6 | DP7 + 0.6M sucrose + trehalose | plate | 89.0 ± 6.0 | 67.9 ± 9.2 |
| *DP6 | DP8 + 0.6M sucrose | plate | 89.2 ± 4.4 | 23.0 ± 3.1 |
| DP7 | DP7 + 0.6M sucrose | plate | 97.6 ± 3.6 | 75.2 ± 4.9 |

VS49 (7.5M)- 2.75M DMSO, 2.0M PD, 2.75M FD:
VS55 (8.4M): 3.1M DMSO, 2.2M PD, 3.1M FD
VS70 (10.7M)-3.88M DMSO, 2.75M PD, 3.88M FD:
VS83 (12.6M)-4.65M DMSO, 3.3M PD, 4.65M FD
DP6 (6.0M)- 3.0M DMSO, 3.0M PD:
DP7 (7.0M)-3.5M DMSO, 3.5M PD:
DP8 (8.0M)-4.0M DMSO, 4.0M PD

TABLE 3-continued

| IL1α release after vitrification | | | |
|---|---|---|---|
| Solution | Day 0 | Day 1 | Day 2 |
| DP8 + sucrose (DP6) | 128.27 ± 14.64 | 141.67 ± 13.86 | 68.33 ± 1.89 |

Initial experiments were done using glass vials, but further experiments were done using the deep well plate of the present disclosure (Table 2). This allowed for the vitrification of multiple constructs at once. In initial experiments, 4-6 constructs per plate were vitrified. Then, further experiments were conducted (repeatedly, and on several occasions) in which 24 constructs were able to be vitrified at once with good results demonstrating consistent viability across the plate.

Figure 6:
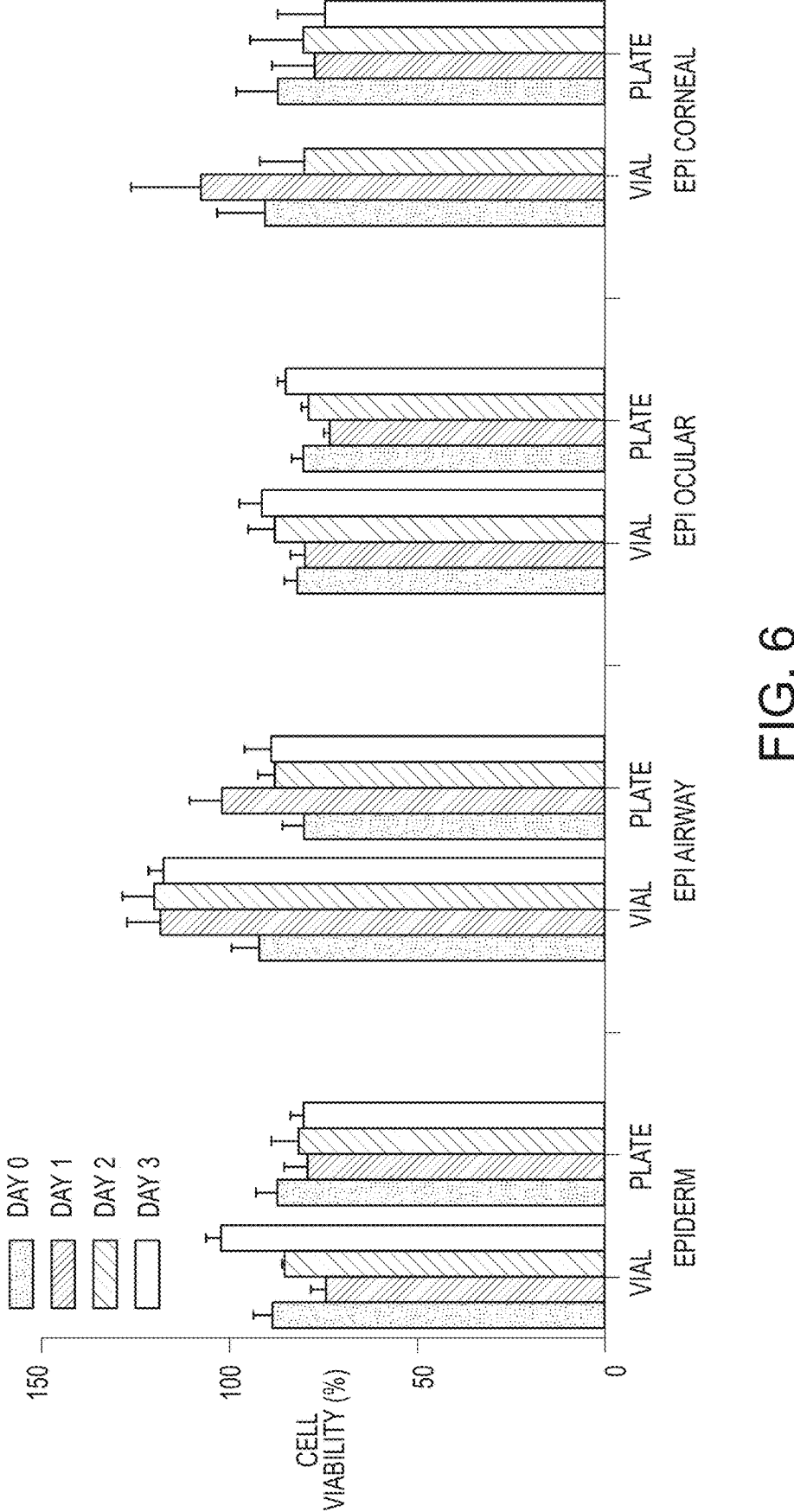
FIG. 6 is a chart illustrating viability of several constructs after vitrification in vials and a deep well plate according to disclosed examples.

In addition, several other constructs were also vitrified in glass vials and deep well plate and included not only Epiderm, but also Epi Airway, Epi Ocular, and Epi Corneal amount other constructs. All of these constructs responded well to being vitrified, and their viability was maintained upon rewarming for several days post rewarming. The results are shown in FIG. 6.

While the constructs could be vitrified successfully in glass vials, it was observed that the viability thereof was more consistent when vitrified in the deep well plate of the present disclosure. However, when using the deep well plate, the timing is important so that the constructs do not sit in the full-strength vitrification solution too long.

Figure 7:
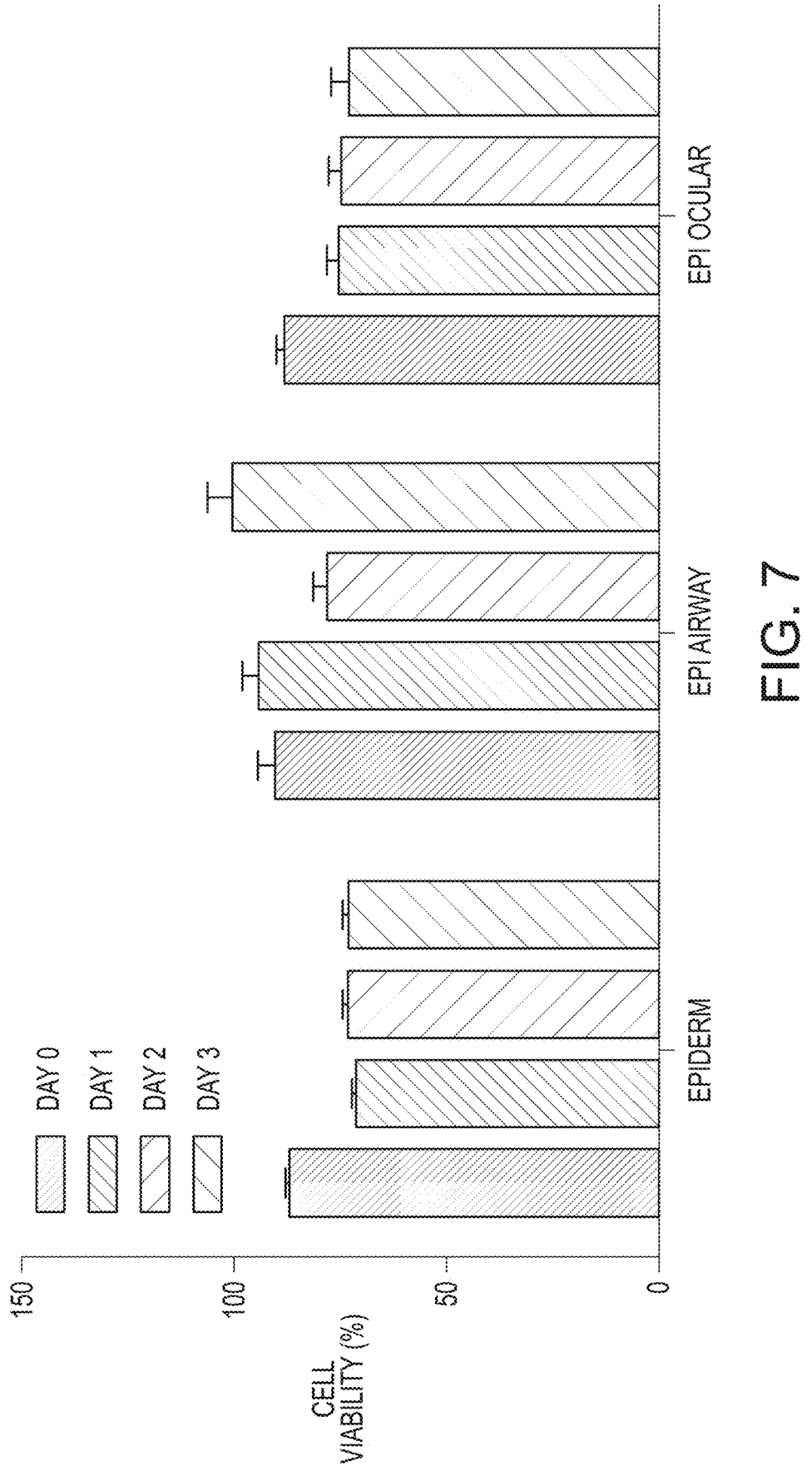
FIG. 7 is a chart illustrating viability after storage of various constructs according to disclosed examples.

Additional experiments were performed to confirm the ability to vitrify and store some of the constructs for up to 7 months at >−135° C. using the deep well plate. The results are shown in FIG. 7 (Epiderm 6 months, Epi Airway 7 months, and Epi Ocular 2 months).
various constructs (Epiderm 6 months, Epi Airway 7 months, and Epi Ocular 2 months).

Each construct demonstrated good viability immediately after rewarming (greater than 85%) that was sustained for several days post (greater than 70%). While initial viability immediately after rewarming was similar using glass vials, sustained viability several days post rewarming was not as consistent or as good at approximately 45%.

Figure 8:
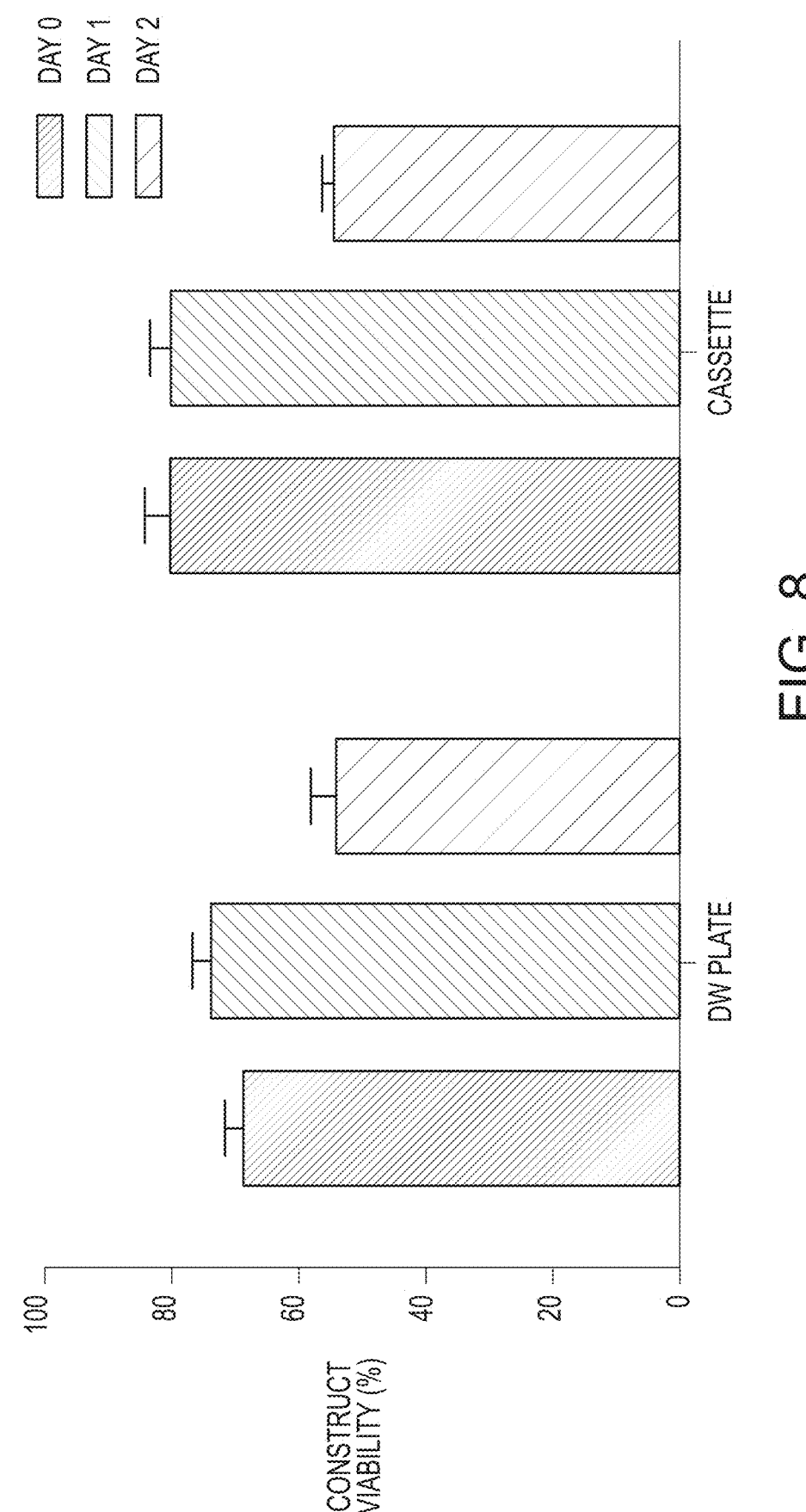
FIG. 8 is a chart illustrating viability in a deep well plate and a cassette according to disclosed examples.

In an effort to vitrify multiple constructs at once without the concern of the constructs staying in the vitrification solution too long and affecting viability, we designed a cassette that holds multiple constructs, up to 24 at one time, so that vitrification steps could be performed on multiple constructs at once. Epiderm constructs were vitrified either in the deep well plate or in the cassette. Upon rewarming, metabolic activity was measured. It was observed that constructs vitrified using the cassette demonstrated viability that was equivalent to constructs that were vitrified in the deep well plate. The results are shown in FIG. 8.

All literature and patent references cited throughout the disclosure are incorporated by reference in their entireties. Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of PRESERVATION OF NATURAL AND BIOENGINEERED TISSUES AND METHODS OF STORING AND TRANSPORT. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for preserving at least one bioengineered construct or natural tissue sample, comprising:
   (i) immersing the at least one bioengineered construct or natural tissue sample in a series of solutions having increasing concentrations of cryoprotectant to form at least one first bioengineered construct or natural tissue that is immersed in a final solution with a cryoprotectant concentration of less than or equal to 70% by weight;
   (ii) cooling the at least one first bioengineered construct or natural tissue in the final solution having said cryoprotectant concentration of less than or equal to 70% by weight to a temperature below the glass transition temperature of the final solution having said cryoprotectant concentration of less than or equal to 70% by weight;
   (iii) immersing the at least one first bioengineered construct or natural tissue in a series of solutions having decreasing concentrations of cryoprotectant to obtain at least one second bioengineered construct or natural tissue immersed in a substantially cryoprotectant-free solution, the at least one second bioengineered construct or natural tissue being a substantially cryoprotectant-free construct; and
   (iv) prior to forming the at least one first bioengineered construct or natural tissue, immersing at least one bioengineered construct or natural tissue in a pre-vitrification solution for at least 6 hours, wherein the pre-vitrification solution comprises at least one agent selected from the group consisting of an anti-oxidant and a caspase inhibitor.

2. The method of claim 1, wherein in the step (i):
   the at least one bioengineered construct or natural tissue sample is immersed in 1 to 6 different solutions, or
   the series of solutions having decreasing concentrations of cryoprotectant is obtained via a linear or nonlinear concentration gradient.

3. The method of claim 2, wherein the at least one bioengineered construct or natural tissue sample is immersed in 1 to 6 different solutions, and the at least one bioengineered construct or natural tissue sample is immersed in each of the different solutions for no longer than 5 minutes.

4. The method of claim 1, wherein in the step (iii):
   the at least one first bioengineered construct or natural tissue sample is immersed in 1 to 7 different solutions, or
   the series of solutions having increasing concentrations of cryoprotectant is obtained via a linear or nonlinear concentration gradient.

5. The method of claim 4, wherein the at least one first bioengineered construct or natural tissue sample is immersed in 1 to 7 different solutions and the at least one first bioengineered construct or natural tissue sample is immersed in each of the different solutions for no longer than 5 minutes.

6. The method of claim 1, wherein the cryoprotectant in step (ii) comprises at least one molecule selected from the group consisting of acetamides, cyclohexanediols, formamides, dimethyl sulfoxide, ethylene glycol, polyethylene glycol, glycerol, disaccharides and propanediol.

7. The method of claim 1, wherein in the step (i) each solution of the series of solutions that the at least one bioengineered construct or natural tissue sample is immersed in comprises at least one sugar.

8. The method of claim 7, wherein the at least one sugar comprises sucrose.

9. The method of claim 1, wherein the at least one agent comprises α-tocopherol.

10. The method of claim 1, wherein the at least one agent comprises quinoline-Val-Asp-difluorophenoxymethyl ketone (Q-VD-OPh).

11. The method of claim 1, wherein the step (i) is conducted in a manner that avoids the growth of ice during the cooling such that ice-induced damage does not occur during the entire method for preserving the at least one bioengineered construct or natural tissue sample.

12. The method of claim 1, wherein the cryoprotectant concentration of the final solution of the step (ii) is in the range of from 8.0 to 11.0 M.

13. The method of claim 1, wherein the at least one first bioengineered construct or natural tissue sample is obtained from a man-made tissue or organ.

14. The method of claim 1, wherein the at least one first bioengineered construct or natural tissue sample is obtained from a cellular material selected from the group consisting of mammalian organs and mammalian tissues.

15. The method of claim 4, wherein the cellular material is selected from the group consisting of human organs and human tissues.

16. The method of claim 1, wherein the at least one first bioengineered construct or natural tissue sample is an epidermal construct.

17. A method for preserving at least one bioengineered construct or natural tissue sample, comprising:

(i) immersing the at least one bioengineered construct or natural tissue sample in a series of solutions having increasing concentrations of cryoprotectant to form at least one first bioengineered construct or natural tissue that is immersed in a final solution with a cryoprotectant concentration of less than or equal to 70% by weight;

(ii) cooling the at least one first bioengineered construct or natural tissue in the final solution having said cryoprotectant concentration of less than or equal to 70% by weight to a temperature below the glass transition temperature of the final solution having said cryoprotectant concentration of less than or equal to 70% by weight; and (iii) immersing the at least one first bioengineered construct or natural tissue in a series of solutions having decreasing concentrations of cryoprotectant to obtain at least one second bioengineered construct or natural tissue immersed in a substantially cryoprotectant-free solution, the at least one second bioengineered construct or natural tissue being a substantially cryoprotectant-free construct, wherein a cell viability (%) of the at least one second bioengineered construct or natural tissue sample after completion of the step (iii) is maintained at a level of at least 60% for at least 48 hours.

18. The method of claim 1, wherein a cell viability (%) of the at least one second bioengineered construct or natural tissue sample after completion of the step (iii) is maintained at a level of at least 70% for at least 48 hours.

19. The method of claim 1, wherein a cell viability (%) of the at least one second bioengineered construct or natural tissue sample after completion of the step (iii) is maintained at a level of at least 80% for at least 48 hours.

20. The method of claim 1, wherein the at least one bioengineered construct or natural tissue sample is comprised in a cassette that holds from 6 to 384 constructs at time, and the cassette comprising the at least one first bioengineered construct or natural tissue sample is submerged in the pre-vitrification solution.

21. The method of claim 1, wherein at least one of the following is satisfied:

in the step (i) the at least one bioengineered construct or natural tissue sample is comprised in a cassette that holds from 6 to 384 constructs at time, and the cassette comprising the at least one bioengineered construct or natural tissue sample is submerged in each solution of the series of solutions of the step (i); and in the step (iii) the at least one first bioengineered construct or natural tissue sample is comprised in a cassette that holds from 6 to 384 constructs at time, and the cassette comprising the at least one first bioengineered construct or natural tissue sample is submerged in each solution of the series of solutions of the step (iii).

22. A method for preserving at least one bioengineered construct or natural tissue sample, comprising:

(i) immersing the at least one bioengineered construct or natural tissue sample in a series of solutions having increasing concentrations of cryoprotectant to form at least one first bioengineered construct or natural tissue that is immersed in a final solution with a cryoprotectant concentration of less than or equal to 70% by weight;

(ii) cooling the at least one first bioengineered construct or natural tissue in the final solution having said cryoprotectant concentration of less than or equal to 70% by weight to a temperature below the glass transition temperature of the final solution having said cryoprotectant concentration of less than or equal to 70% by weight; and (iii) immersing the at least one first bioengineered construct or natural tissue in a series of solutions having decreasing concentrations of cryoprotectant to obtain at least one second bioengineered construct or natural tissue immersed in a substantially cryoprotectant-free solution, the at least one second bioengineered construct or natural tissue being a substantially cryoprotectant-free construct, wherein at least one of the following is satisfied:

in the step (i), the at least one bioengineered construct or natural tissue sample is comprised in a cassette that holds from 6 to 384 constructs at time, and the cassette comprising the at least one bioengineered construct or natural tissue sample is submerged in each solution of the series of solutions of the step (i), and in the step (iii) the at least one first bioengineered construct or natural tissue sample is comprised in a cassette that holds from 6 to 384 constructs at time, and the cassette comprising the at least one first bioengineered construct or natural tissue sample is submerged in each solution of the series of solutions of the step (iii).

23. The method of claim 1, wherein a cell viability (%) of the at least one second bioengineered construct or natural tissue sample after completion of the step (iii) is maintained at a level of at least 60% for at least 48 hours.

\* \* \* \* \*